(12) United States Patent
Nomoto et al.

(10) Patent No.: US 8,749,083 B2
(45) Date of Patent: Jun. 10, 2014

(54) WIND POWER GENERATOR

(75) Inventors: Kazuki Nomoto, Kagoshima (JP);
Kazuomi Nomoto, Kagoshima (JP);
Manabu Yagi, Kagoshima (JP)

(73) Assignee: Birumen Kagoshima Co., Ltd., Kagoshima (JP)

( * ) Notice: Subject to any disclaimer, the term of this patent is extended or adjusted under 35 U.S.C. 154(b) by 0 days.

(21) Appl. No.: 13/379,224

(22) PCT Filed: Dec. 27, 2010

(86) PCT No.: PCT/JP2010/073577
§ 371 (c)(1),
(2), (4) Date: Dec. 19, 2011

(87) PCT Pub. No.: WO2011/151943
PCT Pub. Date: Dec. 8, 2011

(65) Prior Publication Data
US 2013/0043679 A1    Feb. 21, 2013

(30) Foreign Application Priority Data

May 31, 2010  (JP) ................................. 2010-125350
Jun. 7, 2010   (JP) ................................. 2010-130372
Jun. 14, 2010  (JP) ................................. 2010-135106

(51) Int. Cl.
F03D 9/00 (2006.01)
(52) U.S. Cl.
USPC ............................................. 290/44; 310/74
(58) Field of Classification Search
CPC ........ H02K 7/02; H02K 7/025; Y02E 10/725; Y02E 60/16
USPC ............................................ 290/44, 55; 310/74
See application file for complete search history.

(56) References Cited

U.S. PATENT DOCUMENTS

| | | | |
|---|---|---|---|
| 4,439,720 A * | 3/1984 | Georges | 322/4 |
| 6,984,899 B1 * | 1/2006 | Rice | 290/44 |
| 2004/0025506 A1* | 2/2004 | Shaffer | 60/608 |
| 2010/0140937 A1* | 6/2010 | Kirchner et al. | 290/44 |
| 2010/0270800 A1* | 10/2010 | Krietzman et al. | 290/44 |
| 2011/0068582 A1* | 3/2011 | Dugas | 290/55 |

FOREIGN PATENT DOCUMENTS

| | | |
|---|---|---|
| JP | 2002-084796 | 3/2002 |
| JP | 2002-285949 | 3/2002 |
| JP | 2004-239113 | 8/2004 |

* cited by examiner

Primary Examiner — Tulsidas C Patel
Assistant Examiner — Viet Nguyen
(74) Attorney, Agent, or Firm — Thomas | Horstemeyer, LLP

(57) ABSTRACT

A wind power generator comprises a first power generator including a rotor arranged so as to be coaxial with a rotation shaft and generates electric power by the rotation of the rotor, a flywheel which is coaxial with the rotation shaft and arranged through a one-way clutch so that when the rotation shaft increases its speed, the flywheel is in an integrally rotating state with the rotation shaft, and when the rotation shaft reduces its speed, the flywheel is separated from the rotation shaft to rotate inertially, a second power generator including a rotor arranged so as to be coaxial with the flywheel and rotate integrally with the flywheel generates the electric power by the rotation of the rotor with the rotation of the flywheel, and an output portion which externally outputs any one of the electric powers generated by the first and second power generators.

11 Claims, 33 Drawing Sheets

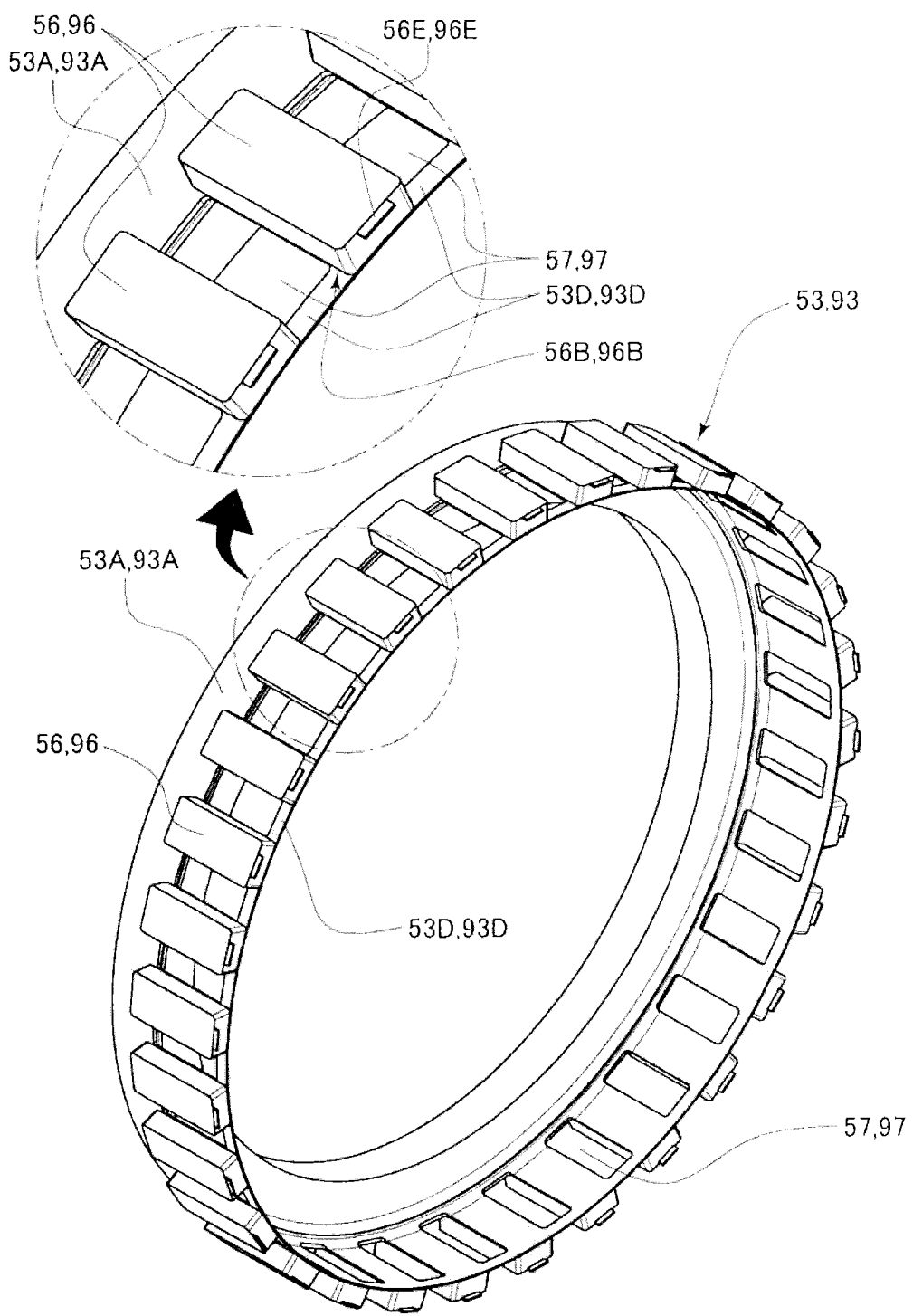

A-A cross section
(With coil)

B-B cross section
(With coil)

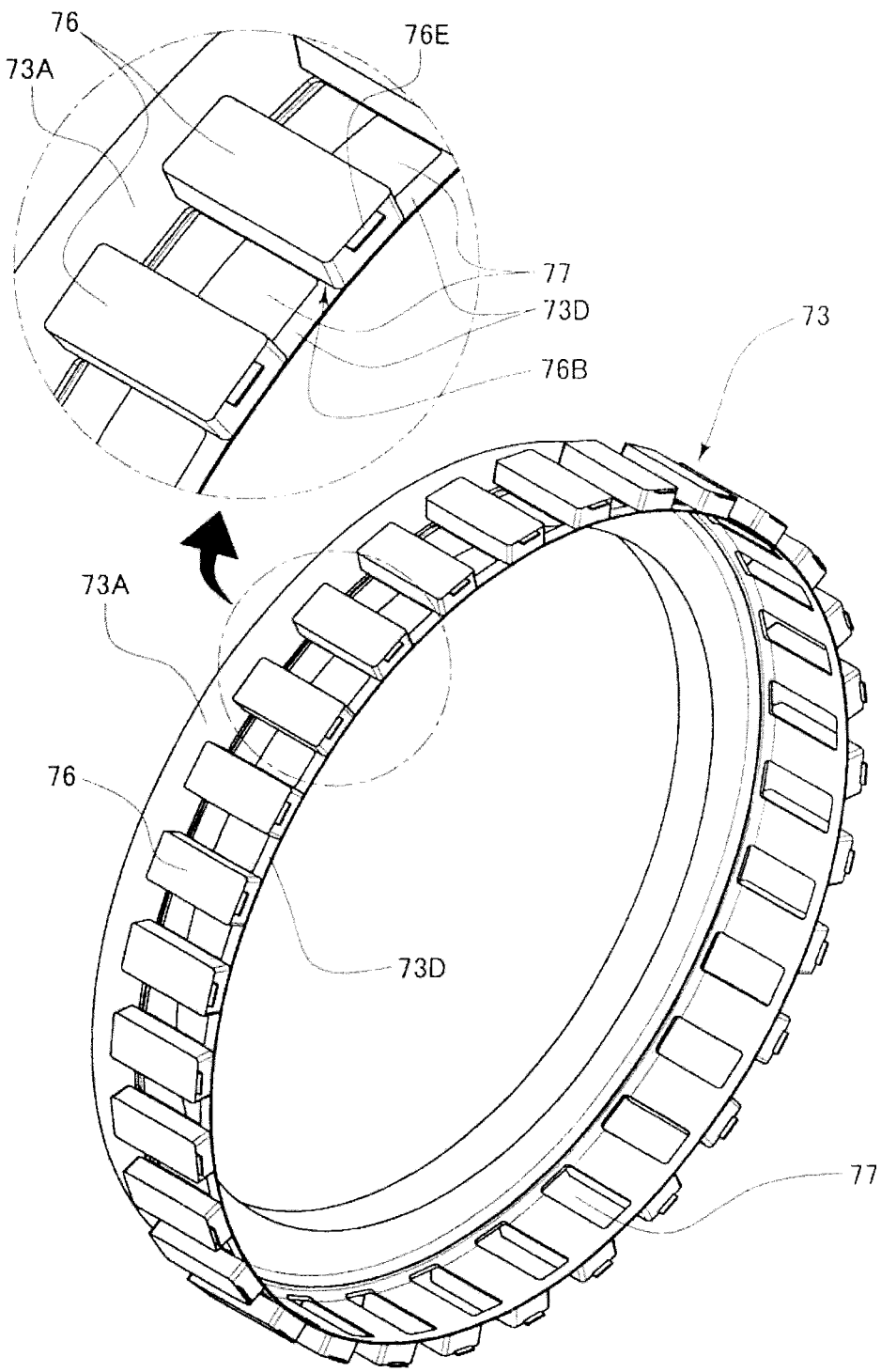

C-C cross section
(With coil)

D-D cross section
(With coil)

WIND POWER GENERATOR

CROSS-REFERENCE TO RELATED APPLICATION

This application is the 35 U.S.C. §371 national stage of PCT application PCT/JP2010/073577, filed Dec. 27, 2010, which claims priority to and the benefit of Japanese Patent Application No. 2010-135106, filed on Jun. 14, 2010, Japanese Patent Application No. 2010-130372, filed on Jun. 7, 2010 and Japanese Patent Application No. 2010-125350, filed May 31, 2010, herein incorporated by reference in its entirety.

BACKGROUND OF THE INVENTION

1. Field of the Invention

The invention relates to a wind power generator.

Recently, for the sake of global environmental protection, as a power generation method using renewable energy, wind power generation free from discharge of greenhouse gases such as carbon dioxide has attracted attention (for example, Patent Document 1).

2. Description of the Related Art

PATENT DOCUMENT

Patent Document 1: Japanese Patent Application Laid-Open Publication No. 2004-239113

SUMMARY OF THE INVENTION

Problems to be Solved by the Invention

However, in the wind power generation, since power generation output is varied in accordance with variation of wind speed, there is a problem that it is unstable.

An object of the invention is to provide a wind power generator which can further stabilize unstable power generation output in the wind power generation.

Means for Solving the Problems

In order to solve the above problem, a wind power generator of the invention comprises a windmill, first power generation unit, a flywheel, second power generation unit, and output unit. The windmill receives wind power to be rotated in a constant rotational direction around a predetermined rotation shaft line. The first power generation unit has a rotor, which is arranged so as to be coaxial with the rotation shaft of the windmill and rotate integrally with the rotation shaft, and generates electric power by the rotation of the rotor with the rotation of the rotation shaft. The flywheel is coaxial with the rotation shaft and arranged through a one-way clutch so that when the rotation shaft increases its speed in the constant rotational direction, the flywheel rotates with increased speed in an integrally rotating state with the rotation shaft, and when the rotation shaft reduces its speed in the constant rotational direction, the flywheel is separated from the rotation shaft to rotate inertially. The second power generation unit has a rotor, which is arranged so as to be coaxial with the flywheel and rotate integrally with the flywheel, generates the electric power by the rotation of the rotor with the rotation of the flywheel, and is different from the first power generation unit. The output unit receives input of the electric power generated by at least the second power generation unit among the electric powers generated by the first power generation unit and the second power generation unit and externally outputs the input electric power. The wind power generator is characterized in that at least a portion of the electric power generated by the first power generation unit among the electric powers generated by the first power generation unit and the second power generation unit is input to the output unit and externally output along with the electric power generated by the second power generation unit. Alternatively, the drive electric power supply unit supplies the at least portion of the electric power generated by the first power generation unit as drive electric power for electric drive unit that rotates and drives the flywheel in the constant rotational direction.

According to the constitution of the invention, although the electric power generated by the first power generation unit is significantly varied according to the wind power received by the windmill, the electric power generated by the second power generation unit is generated based on a stable rotational energy stored in the flywheel; therefore, the output is stable, and at least the electric power generated by the second power generation unit is output (including the case where the electric power generated by the second power generation unit is output such that the first power generation unit is superimposed on the electric power generated by the second power generation unit), whereby relatively stable power generation output can be obtained.

Further, if the electric powers generated by the first power generation unit and the second power generation unit are superimposed and output, the instability of the electric power generated by the first power generation unit is mitigated and relatively stable power generation output can be obtained as a whole.

When the windmill rotates with reduced speed, or when the rotation is stopped, the flywheel is held in a state of being separated from the rotation shaft of the windmill by a one-way clutch (in the invention, this state is referred to as an inertial rotating state), and therefore, the flywheel continues to rotate. Namely, the flywheel is in the inertial rotating state, whereby since speed reduction factors on the flywheel side are significantly reduced, the rotation can be continued for a longer time. Even if the windmill is stopped, the rotation of the flywheel is continued. Meantime, stable power generation output can be obtained from the second power generation unit, although smooth attenuation occurs over time, and the power generation output can be output externally. Even if the electric power generated by the first power generation unit is superimposed thereon, the instability of the electric power generated by the first power generation unit is significantly mitigated.

When the windmill rotates with increased speed, the rotation shaft of the windmill and the flywheel are in a state of rotating integrally with each other to store the rotational energy in the flywheel, and therefore, even if the windmill reduces its speed after that, by virtue of the rotational energy stored when the windmill rotates with increase speed, stable power generation output can be continuously obtained from the second power generation unit for longer periods of time, corresponding to the stored rotational energy. Further, when the windmill rotates with increased speed, the power generation output is increased by a two-stage power generation state according to the first power generation unit and the second power generation unit; however, the flywheel with a larger weight becomes a rotational resistance, so that excessive speed-increased (accelerated) rotation does not occur in the windmill, and the entire power generation output is not excessively increased. Thus, even in the two-stage power generation state, the entire power generation output can be maintained at a relatively stable state.

Furthermore, when the windmill rotates with increased speed, the rotation shaft of the windmill and the flywheel are in a state of rotating integrally with each other, and therefore, even if the flywheel is stopped or in an excessively low speed rotating state, a direct torque from the windmill is applied to the flywheel if the rotational speed of the windmill is increased, and the rotational speed is increased. Thus, even when the flywheel is stopped or rotates at low speed, the windmill starts to rotate to be accelerated, whereby the torque is transmitted to the flywheel, and the rotation can be continued.

According to the above constitution of the invention, the rotation of the flywheel may be assisted using at least a portion of the electric power generated by the first power generation unit. In order to start the rotation of the flywheel again when the rotation of the flywheel is stopped or when the flywheel rotates at low speed (particularly when the rotation is stopped), a very large torque is required; however, according to the above constitution, in order to prevent the rotation of the flywheel from being stopped, the drive electric power supply unit can supply at least a portion of the electric power generated by the first power generation unit to the electric drive unit that rotates and drives the flywheel and can drive the electric drive unit. Therefore, the rotation of the flywheel can be prevented from being stopped, and a torque for starting the rotation again is not required to be generated. Even if the rotation of the flywheel is stopped, the rotation can be started again.

The wind power generator of the above invention can be constituted to comprise the electric drive unit and the drive electric power supply unit and further comprise rotational speed level detection unit that detects a rotational speed level of the flywheel and drive electric power control unit that when the detected rotational speed level is less than a previously determined threshold rotational speed level, makes the drive electric power supply unit supply the drive electric power to the electric drive unit.

According to the above invention, when the rotational speed of the flywheel is not more than a certain level, the electric drive unit assists the rotation of the flywheel in a constant rotational direction, and therefore, the power generation output stably output from the flywheel can be continuously output for a longer time. When the rotation of the flywheel is stopped or when the flywheel rotates at low speed (particularly when the rotation is stopped), a very large torque is required in order to start the rotation again. However, according to the above constitution, the drive electric power supply unit is controlled by the drive electric power control unit so as to prevent the rotation of the flywheel from being stopped, and therefore, the torque for starting the rotation again is not required to be generated. For example, when the state that the rotational speed of the flywheel is not more than the certain level is determined as the state that the rotation of the flywheel is stopped, the flywheel in a stopped state can be rotated again by the electric drive unit.

In the invention, the drive electric power supply unit can be constituted to supply to the electric drive unit the drive electric power for the electric drive unit based on the electric power supplied from an external power supply system. According to this constitution, since the electric drive unit can be driven using the electric power supplied from the external power supply system, the electric power can be stably supplied to the electric drive unit, and there is no need to worry that the flywheel is stopped.

In the invention, the drive electric power supply unit can be constituted to supply to the electric drive unit the drive electric power for the electric drive unit based on the electric power stored in storage unit. Also in this case, since the electric drive unit can be driven using the electric power previously stored in the storage unit, the electric power can be stably supplied to the electric drive unit, and there is no need to worry that the flywheel is stopped.

In the invention, such a constitution can be realized that the electric power generated by the first power generation unit is stored in the storage unit. In this case, the output unit can be constituted to externally supply only the electric power generated by the second power generation unit. According to this constitution, the electric power generated by the first power generation unit in which the output is unstable is stored in the storage unit, and only the electric power generated by the second power generation unit in which the output is stable can be output externally.

In the invention, such a constitution is realized that the electric powers generated by the first power generation unit and the second power generation unit are stored in the storage unit. In this case, the electric power externally supplied from the output unit can be regarded as the electric power temporarily stored in the storage unit. According to this constitution, since an electric power supply source that externally supplies the electric power is the storage unit, the electric power can be output stably.

In the invention, when a drive electric power for the electric drive unit based on the electric power stored in first storage unit is supplied to the electric drive unit, and any one of the electric powers generated by both the first power generation unit and the second power generation unit is stored in second storage unit, the first storage unit and the second storage unit can be provided as common storage unit. According to this constitution, a plurality of the storage units are not required to be provided. In this case, remaining amount detection unit and output electric power control unit can be provided. The remaining amount detection unit detects the remaining amount in the common storage unit. When the detected remaining amount is more than a previously determined threshold remaining amount, the output electric power control unit makes the output unit externally supply the electric power stored in the storage unit. According to this constitution, a certain driving electric power for rotating the flywheel can be constantly secured in the storage unit.

In the invention, when the electric drive unit is driven by the electric power stored in the storage unit, the wind power generator can be constituted to comprise remaining amount detection unit and stored electric power control unit. The remaining amount detection unit detects the remaining amount in the storage unit. When the detected remaining amount is not more than the previously determined threshold remaining amount, the stored electric power control unit supplies the electric power to the storage unit to make the storage unit store the electric power. When the detected remaining amount is more than the threshold remaining amount, the electric power to be supplied to the storage unit when the detected remaining amount is not more than the threshold remaining amount (electric power to be supplied to the storage unit when the detected remaining amount is not more than the threshold remaining amount) is input to the output unit and then output externally. According to this constitution, since a surplus electric power that is not stored in the storage unit can be output externally, the amount of the electric power to be output externally can be increased.

In the invention, the output unit can externally supply the input of the electric powers, generated by the first power generation unit and the second power generation unit, together. The electric powers generated by the first power generation unit and the second power generation unit are superimposed and output, whereby the instability of the electric power generated by the first power generation unit is mitigated, and relatively stable power generation output can be externally supplied as a whole. For example, the power generation output can be supplied to an external power supply system and the storage unit.

The electric drive unit in the invention uses as a drive source the electric power generated by the first power generation unit and can rotate and drive the flywheel in the constant rotational direction. In this case, the drive electric power supply unit supplies all the electric power, generated by the first power generation unit, as the drive electric power for the electric drive unit, and the output unit can externally output the electric power generated by the second power generation unit.

According to the above constitution of the invention, although the electric power generated by the first power generation unit is significantly varied according to the wind power received by the windmill, all the electric power generated by the first power generation unit is always utilized as the drive electric power for rotating the flywheel, and only the other electric power generated by the second power generation unit is output externally. The electric power generated by the second power generation unit is generated based on the stable rotational energy stored in the flywheel, and therefore, the electric power to be output is stably output without being affected by weather conditions or the like, and, in addition, the electric drive unit assists the rotation of the flywheel in the constant rotational direction using the electric power generated by the first power generation unit; therefore, the power generation output to be stably output from the flywheel can be continuously output for a longer time.

The second power generation unit and the electric drive unit are provided integrally with the flywheel, and a rotor and a stator of the electric drive unit can be located on the outer peripheral side than a rotor and a stator of the second power generation unit. The electric drive unit is located on the outer peripheral side, whereby since the assist power in a constant rotational direction of the flywheel is applied more outside in the radial direction, the rotation force can be transmitted effectively.

The flywheel can be arranged between the first power generation unit and the second power generation unit in the shaft line direction of the rotation shaft. Namely, the first power generation unit and the second power generation unit in a power generation case body are located to hold the flywheel therebetween in the shaft line direction of the rotation shaft 2, and a string of space in the power generation case body can be divided by the flywheel into an upstream storage space in which one power generation unit is stored and a downstream storage space in which the other power generation unit is stored. According to this constitution, in the upstream storage space and the downstream storage space, one storage space is not affected by a disturbance of airflow associated with the rotation of a rotating body in the other storage space, and the rotation of the rotating body in each storage space is stabilized.

BRIEF DESCRIPTION OF THE DRAWINGS

FIG. 7 is an oblique perspective view of a stator of a power generator in the wind power generator of the first to third embodiments;

FIG. 15 is an oblique perspective view of a stator of an electric motor in the wind power generator of the second and third embodiments;

PREFERRED EMBODIMENTS FOR CARRYING OUT THE INVENTION

Hereinafter, a first embodiment of a wind power generator of the invention will be described with reference to the drawings.

Figure 1:
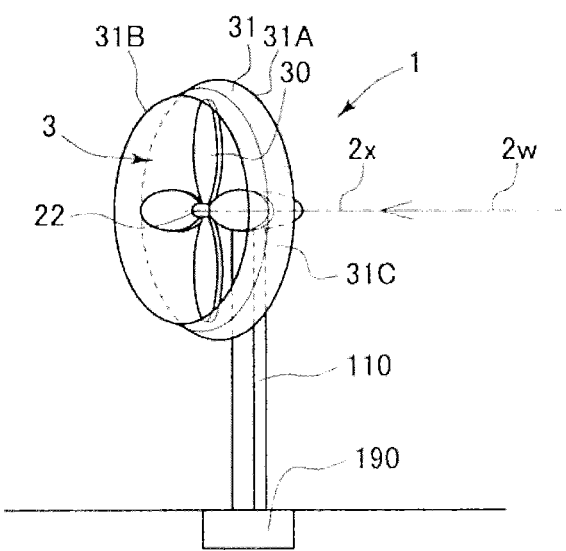
FIG. 1 is an external view showing in a simplified manner a wind power generator as the first to third embodiments of the invention.
Figure 2:
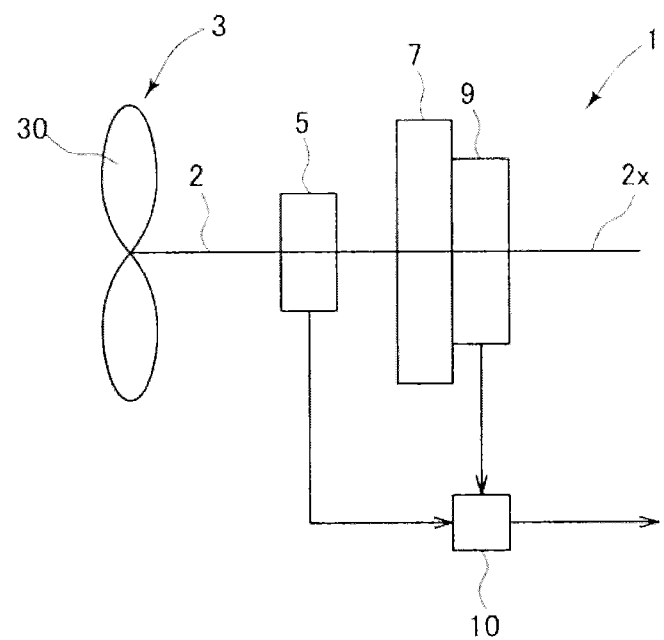
FIG. 2 is a block diagram showing in a simplified manner an electrical configuration of the wind power generator of the first embodiment.

FIG. 1 is a schematic view schematically showing a configuration of the wind power generator of the first embodiment in the invention. FIG. 2 is a block diagram showing in a simplified manner the configuration of the wind power generator of FIG. 1. The wind power generator of the first embodiment shown in FIGS. 1 and 2 is constituted to comprise a windmill 3, a first power generator (power generation unit) 5, a flywheel 7, and a second power generator (power generation unit) 9. The wind mill 3 receives wind power from a certain wind receiving direction 2w to be rotated in a constant rotational direction around a predetermined rotation shaft line 2x. The first power generator 5 has a rotor 51 arranged so as to be coaxial with the rotation shaft 2 of the windmill 3 and rotated integrally with the rotation shaft 2 and generates electric power by the rotation of the rotor 51 with the rotation of the rotation shaft 2. The flywheel 7 is coaxial with the rotation shaft 2 and arranged through a one-way clutch 6 so that when the rotation shaft 2 increases its speed in the constant rotational direction of the rotation shaft 2, the flywheel 7 is in an integrally rotating state with the rotation shaft 2 and rotates with increased speed, and when the rotation shaft 2 reduces its speed in the constant rotational direction, the flywheel 7 is separated from the rotation shaft 2 to rotate inertially. The second power generator 9 has a rotor 91 arranged so as to be coaxial with the flywheel 7 and rotate integrally with the flywheel 7, generates the electric power by the rotation of the rotor 91 with the rotation of the flywheel 7, and is different from the first power generator 5.

With regard to the flywheel 7 specifically, the flywheel 7 is arranged through the one-way clutch 6 so that when the rotation shaft 2 increases its speed in the constant rotational direction relative to the flywheel 7, the flywheel 7 rotates with increased speed in an integrally rotating state with the rotation shaft 2, when the rotation shaft 2 reduces its speed in the constant rotational direction relative to the flywheel 7, the flywheel 7 is separated from the rotation shaft 2 to rotate inertially, and when the rotation shaft 2 rotates with a speed equal to the rotational speed of the flywheel 7, and particularly when the rotation shaft 2 is stopped, the flywheel 7 is separated from the rotation shaft 2 to rotate inertially.

The wind power generator 1 of the first embodiment further comprises an output portion 10 which receives input of the electric power generated by at least the second power generator 9 among the electric powers generated by the first power generator 5 and the second power generator 9 and externally outputs the input electric power. At least a portion of the electric power generated by the first power generator 5 among the electric powers generated by the first power generator 5 and the second power generator 9 is input to the output portion 10 to be externally output along with the electric power generated by the second power generator 9. Alternatively, a drive electric power supply portion (drive electric power supply unit) 16 can supply the at least portion of the electric power generated by the first power generator 5 as the drive electric power for an electric motor (electric drive unit) 70 which rotates and drives the flywheel 7 in the constant rotational direction. The at least a portion of the electric power generated by the first power generator 5 may be the electric power corresponding to a fixed ratio in the relevant electric power, the electric power corresponding to the exceeding amount of a certain electric power amount, or the electric power generated within a certain period.

In the first embodiment, an output portion which receives the electric powers generated by the first power generator 5 and the second power generator 9 to output the electric powers together to an external device 19 is provided as the output portion (output unit: see FIGS. 3A and 3B) 10. Namely, the output lines of the generated electric power by the first power generator 5 and the second power generator 9 are connected until reaching an external output, and the electric power is externally output by one system.

Figure 3A:
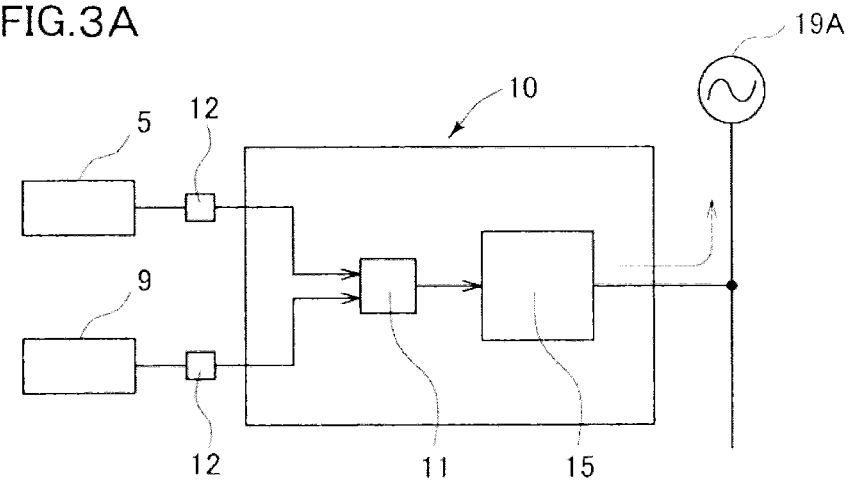
FIG. 3A is an example of a block diagram showing in a simplified manner an electrical configuration of an output portion of the wind power generator of the first embodiment.
Figure 3B:
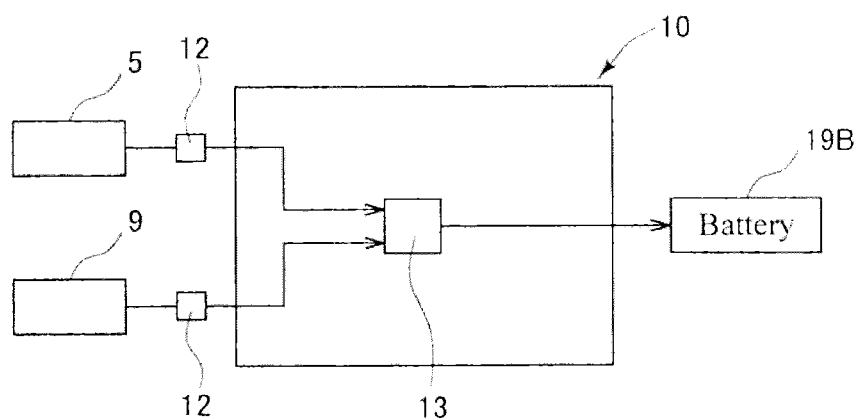
FIG. 3B is a second example of a block diagram showing in a simplified manner an electrical configuration of the output portion of the wind power generator of the first embodiment.

In the output portion 10, as shown in FIG. 3A, for example, the three-phase AC powers generated by the first power generator 5 and the second power generator 9 are input to rectifiers 12 to be input to a step-up controller 11, and, thus, to be output at a predetermined voltage. The output is further input to a power conditioner 15, and the input DC power is converted into a system power to be output. According to this constitution, the electric powers generated by the first power generator 5 and the second power generator 9 can be supplied together to an external power supply system 19A, and the electric power, for example, may be sold. Alternatively, the power conditioner 15 converts the electric power into AC power that can be used at home, and the AC power may be output. Further, in the output portion 10, as shown in FIG. 3B, the electric powers generated by the first power generator 5 and the second power generator 9 are input to the rectifiers 12 to be input to a step-up controller 13, and the DC power with a predetermined voltage may be supplied to a battery (storage unit) 19B to be stored therein. Further, the electric power stored in the battery (storage unit) 19B may be supplied to an external power supply system 19A through the power conditioner 15.

In the windmill 3 of the first embodiment, as shown in FIG. 2, the wind receiving direction 2w coincides with the extending direction of the shaft line 2x of the rotation shaft 2 (hereinafter referred to as shaft line direction). The windmill 3 has a plurality of blades 30 which receive the wind power from the wind receiving direction 2w to be rotated in a constant direction. The respective blades 30 are coupled (connected) to the rotation shaft 2 through a hub 22.

Figure 4:
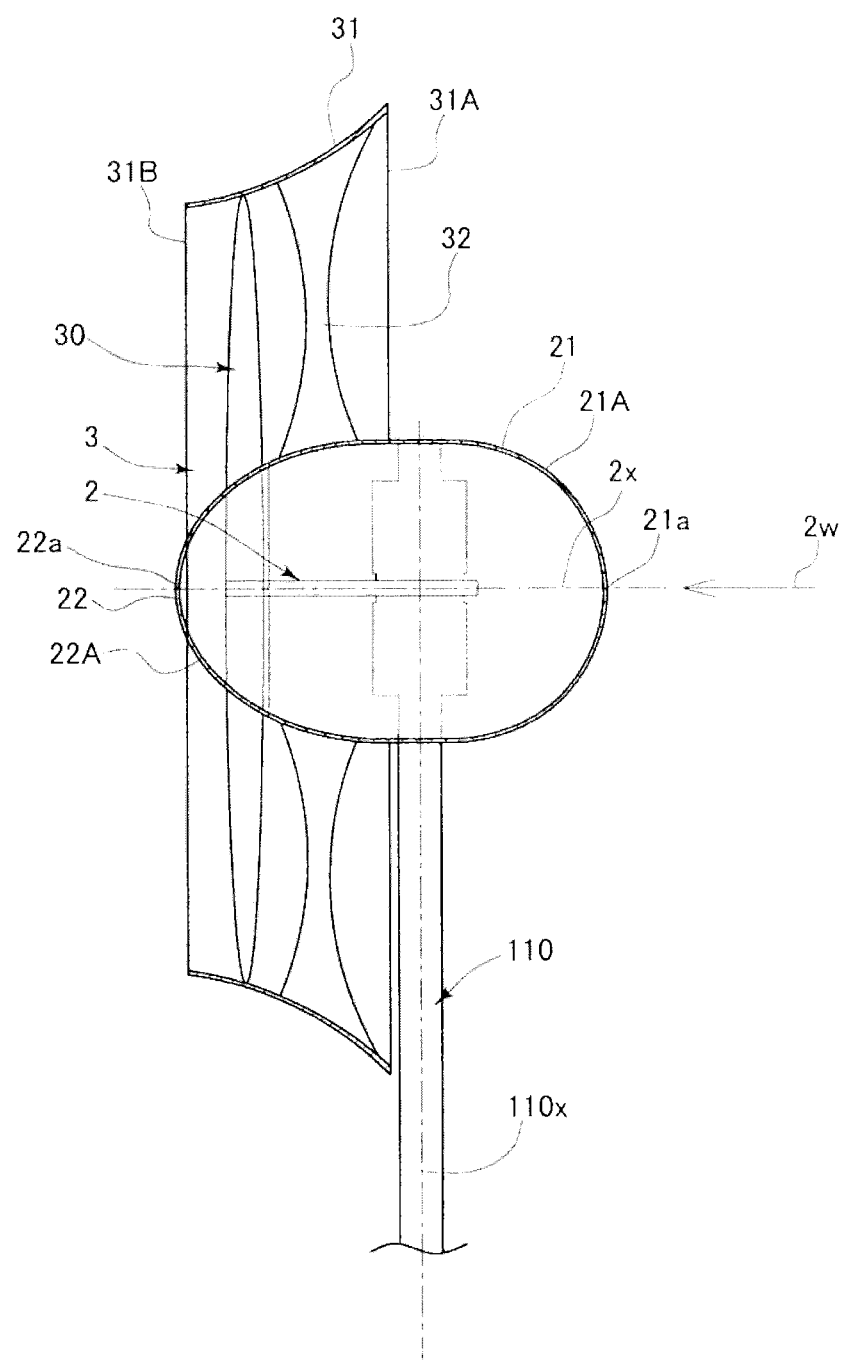
FIG. 4 is an enlarged cross-sectional view showing in a simplified manner a windmill portion in the wind power generator of the first to third embodiments.

FIG. 4 is an enlarged cross-sectional view of a windmill portion of the wind power generator 1 of the first embodiment. However, the inner structure of the nacelle 21 is shown in a simplified manner. The windmill 3 is arranged inside a tubular wind tunnel portion (duct) 31 extending in a tubular manner so as to be coaxial with the shaft line direction of the rotation shaft 2. The tubular wind tunnel portion 31 is formed so that the opening space is reduced from the upstream side in the wind receiving direction 2w of the windmill 3 toward the downstream side. Specifically, the tubular wind tunnel portion 31 has such a curved shape that bulges inward in the radial direction in a section from an annular end portion 31A on the upstream side in the wind receiving direction 2w to an annular end portion 31B on the downstream side. The wind taken into the tubular wind tunnel portion 31 is compressed to be supplied downstream, and, thus, to be received by a downstream blade, whereby the rotation force of the windmill 3 can be increased.

In the tubular wind tunnel portion 31 of FIG. 4, a plurality of supporting members (FRP) 32 extending radially outward from an outer peripheral surface 210 of a nacelle 21 are fixed to the inner peripheral surface of the tubular wind tunnel portion 31. The supporting members 32 are provided to be irrotational with respect to the rotation shaft 2 along with the nacelle 21.

Figure 5:
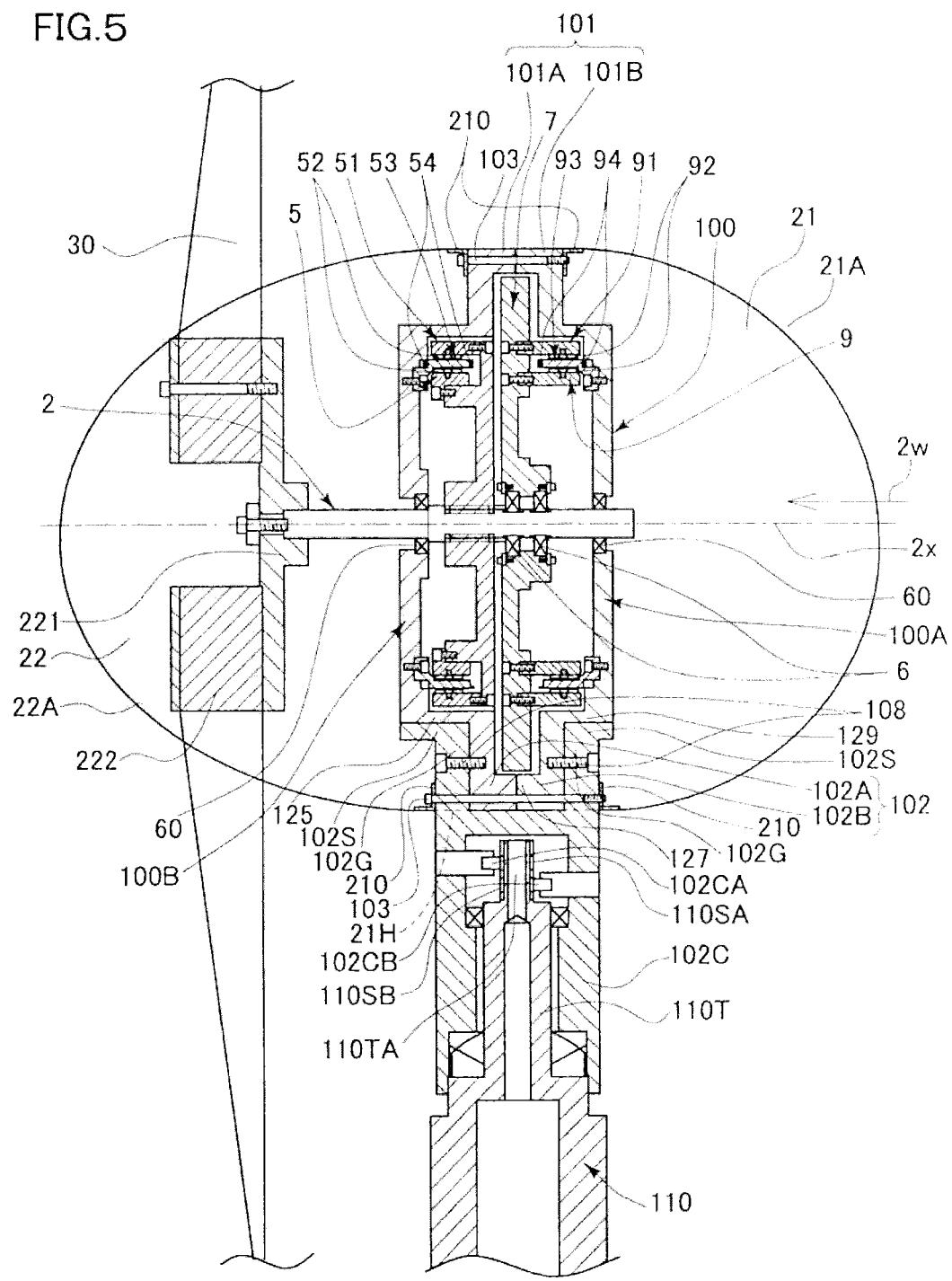
FIG. 5 is an enlarged cross-sectional view of a nacelle portion in the wind power generator of the first embodiment.

The nacelle 21 stores therein the first power generator 5, the flywheel 7, the second power generator 9, and the rotation shaft 2. As shown in FIGS. 4 and 5, an outer surface 21A of the nacelle 21 is formed as a curved surface having a top portion 21a on the upstream side in the wind receiving direction 2w on at least the shaft line 2x of the rotation shaft 2. Specifically, the outer surface 21A forms a rotational symmetry surface whose surface shape is not changed even if it is rotated around the shaft line direction of the rotation shaft 2 and has a streamline shape herein. On the other hand, the hub 22 fixed to the rotation shaft 2 of the windmill 3 so as to rotate integrally with respect to the windmill 3 is provided on the downstream side in the wind receiving direction 2w of the nacelle 21. An outer surface 22A of the hub 22 forms a curved surface smoothly continuing in the wind receiving direction 2w from a curved surface forming the outer surface 21A of the nacelle 21 and a curved surface having a top portion 22a on the upstream side in the wind receiving direction 2w on the shaft line 2x of the rotation shaft 2. Specifically, the outer surface 22A forms a rotational symmetry surface whose surface shape is not changed even if it is rotated around the shaft line direction of the rotation shaft 2 and has a streamline shape continuing from the outer surface 21A of the nacelle 21. The outer surfaces 21A and 22A of the nacelle 21 and the hub 22 form a spherical surface as a whole, and the spherical surfaces 21A and 22A have an egg shape in which the upstream top portion 21a has a larger curvature radius than the downstream top portion 22a.

In the nacelle 21, at least a portion is located inside the tubular wind tunnel portion 31, and the rest thereof protrudes outside the tubular wind tunnel portion 31. As shown in FIG. 4, the nacelle 21 of the first embodiment is arranged so that the top portion 21a protrudes from the inside of the tubular wind tunnel portion 31 on the wind receiving side of the windmill 3 (on the upstream side in the wind receiving direction 2w). The hub 22 connecting the respective blades 30 and the rotation shaft 2 is provided on the downstream side in the wind receiving direction 2w of the nacelle 21. Namely, the blade 30 is provided on the downstream side from the nacelle 21 in the wind receiving direction 2w, and the rotation force obtained in the downstream blade 30 is transmitted toward the power generators 5 and 9, located on the upstream side in the wind receiving direction 2w, through the rotation shaft 2. As shown in FIG. 5, the hub 22 has a disk-shaped shaft fixing portion 221 and a tubular blade attachment portion 222. The central portion of the shaft fixing portion 221 is fixed to the downstream end in the wind receiving direction 2w of the rotation shaft 2 by a fastening member. The blade attachment portion 222 is fixed to an outer peripheral portion on a downstream main surface in the wind receiving direction 2w in the shaft fixing portion 221 by a fastening member. A plurality of the blades 30 extend radially from an outer peripheral surface of the blade attachment portion 222.

The nacelle 21 is attached to an upper end portion 110T of a column (tower) 110, extending from a base portion 190 (see FIG. 1) of the earth's surface, so as to enable to change the direction in a horizontal plane according to the wind direction (so as to be rotatable around a shaft line 110x (see FIG. 4) in the vertical direction of the column 110). Then, the tubular wind tunnel portion 31 covering the respective blades 30 from the outer peripheral side is provided on the downstream side in the wind receiving direction 2w of the nacelle 21, whereby the tubular wind tunnel portion 31 functions as means like a rear plane varying the wind receiving direction 2w of the windmill 3. Namely, when a tubular outer peripheral surface 31C of the tubular wind tunnel portion 31 (particularly, the surface in the horizontal direction: see FIG. 1) receives the wind, the tubular wind tunnel portion 31 is rotated with respect to the upper end portion 110T of the column 110 to turn the top portion 21a of the nacelle 21 to the direction from which the wind blows. The tubular wind tunnel portion 31 is located on the downstream side in the wind receiving direction 2w relative to the nacelle 21, so that the direction of the nacelle 21, that is, the direction of the wind receiving surface of the windmill 3 can be prevented from being finely changed by a slight change of the wind direction.

Figure 6:
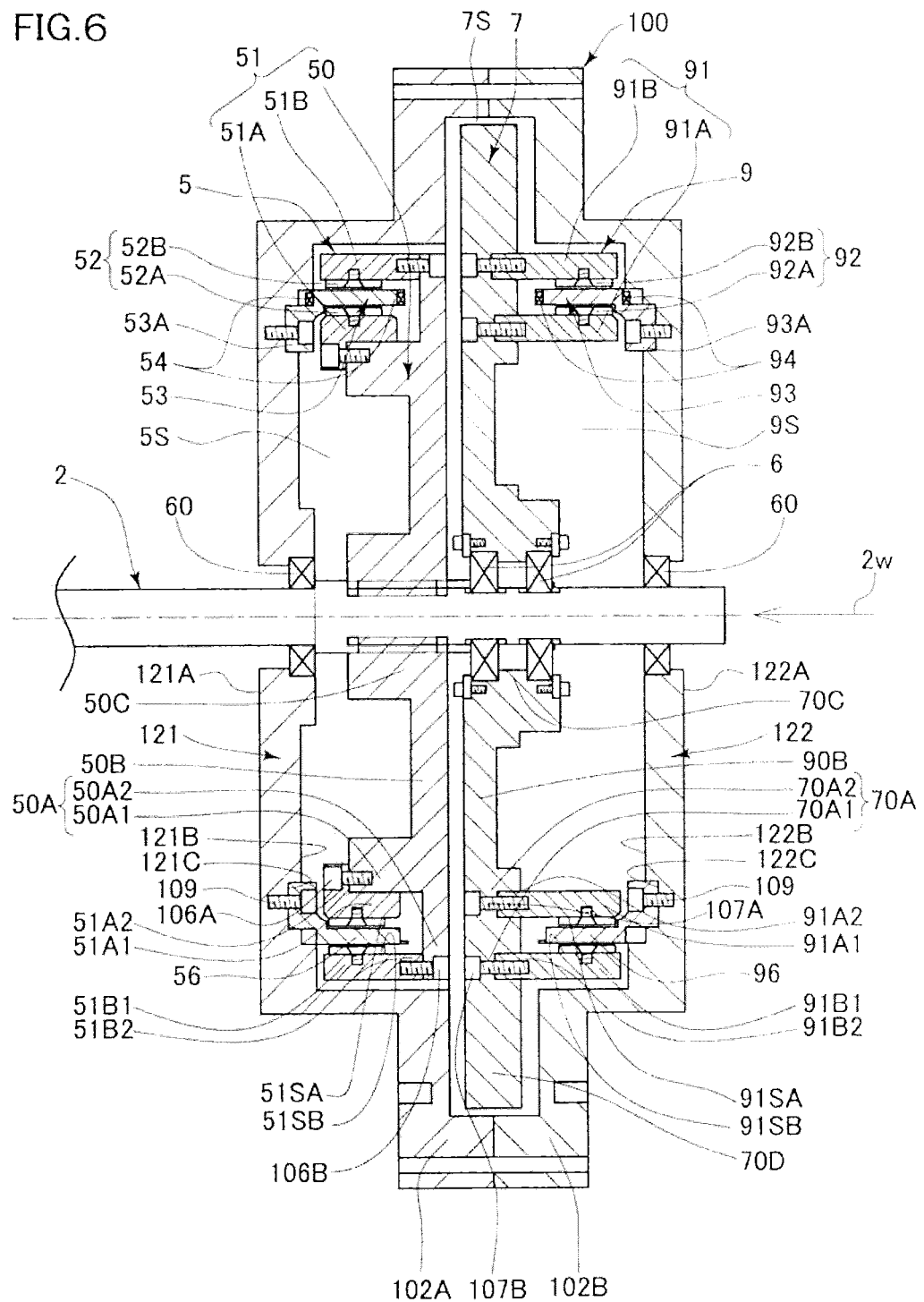
FIG. 6 is an enlarged cross-sectional view of the inside of a power generation case body in the wind power generator of the first embodiment.

FIG. 5 is a cross-sectional view in which the nacelle of FIG. 4 is cut along a plane passing through the shaft lines 2x and 110x. The nacelle 21 includes a power generation case body 100 storing the second power generator 9, the flywheel 7, and the first power generator 5 in this order from the upstream side in the wind receiving direction 2w of the windmill 3. The power generation case body 100 is fastened and fixed to the nacelle 21 by a fastening member 103. As shown in FIG. 6, The internal space in the power generation case body 100 has an upstream storage space 9S storing the second power generator 9, an intermediate storage space 7S storing the flywheel 7, and a downstream storage space 5S storing the first power generator 5 in sequence from the upstream side in the wind receiving direction 2w. The power generation case body 100 has such a shape that those spaces forma string of space. The flywheel 7 is arranged in the intermediate storage space 7S, whereby the string of space is divided into the upstream storage space 9S and the downstream storage space 5S. The diameter of the tubular intermediate storage space 7S is larger than the diameters of the tubular upstream and downstream storage spaces 9S and 5S, and the flywheel 7 stored in the intermediate storage space 7S is located closely to a tubular outer peripheral wall of the intermediate storage space 7S in the radial direction. Therefore, when the flywheel 7 is arranged, the upstream storage space 9S and the downstream storage spaces 5S communicate only on the outer peripheral side of the flywheel 7, and therefore, the upstream storage space 9S and the downstream storage space 5S are more reliably separated.

As shown in FIGS. 5 and 6, the first power generator 5 and the second power generator 9 in the power generation case body 100 are located so as to hold the flywheel 7 therebetween in the shaft line direction of the rotation shaft 2, and a space in the power generation case body 100 is divided into the upstream storage space 9S and the downstream storage space 5S by the flywheel 7. According to this constitution, one of the upstream storage space 9S and the downstream storage space 5S is not affected by a disturbance of airflow associated with the rotation of the rotating body (rotors 91 or 51) in the other storage space. In the first embodiment, as shown in FIG. 5, the second power generator 9, the flywheel 7, and the first power generator 5 are located in this order from the upstream side in the wind receiving direction 2w, and the hub 22 is located on the downstream side thereof. The flywheel 7 may be formed of a magnetic shielding material (for example, soft magnetic material such as iron), whereby the space in the power generation case body 100 is magnetically divided into the first power generator 5 side and the second power generator 9 side by the flywheel 7, and magnetic interference therebetween may be prevented.

The rotation shaft 2 is attached to the power generation case body 100 through a bearing device 60 so as to penetrate through the power generation case body 100 in its shaft line direction and smoothly relatively rotate with respect to the power generation case body 100 (see FIG. 6). The bearing device 60 of the first embodiment is a sealed bearing device having a sealing function such as a sealing device (O-ring and so on) and a grease, and the power generation case body 100 is sealed by the sealing function. When air is filled with atmospheric pressure, the inside of the sealed power generation case body 100 is in a state of being depressurized, for example, so as to reduce resistance (air resistance) due to the filled gas that is applied to the rotating bodies 51, 91, and 7 in the power generation case body 100. In the embodiment, He gas is filled in the power generation case body 100, whereby the rotational resistance of the rotors 51 and 91 and the flywheel 7 as the rotating bodies is reduced.

In the first power generator 5 and the second power generator 9, a plurality of magnetic members 52 and 92 are arranged at predetermined intervals along the circumferential directions of the rotors (generator rotors) 51 and 91 rotatable around the rotation shaft 2. The first power generator 5 and the second power generator 9 are constituted to comprise stators (generator stators) 53 and 93. The stators 53 and 93 face the magnetic members 52 and 92 so as to form an air gap, and stator coils 54 and 94 irrotational with respect to the rotors 51 and 91 are arranged in the stators 53 and 93. The electric power is generated by relative rotation between the magnetic members 52 and 92 and the stator coils 54 and 94. The higher the relative rotational speed, the larger the electric power to be generated (generated electric power). The magnetic members 52 and 92 of the first embodiment are permanent magnets, and neodymium magnet can be used, for example. However, electromagnet may be used instead of the permanent magnet.

In the first embodiment, a ratio of the number of the magnetic members 52 and 92 to the number of the stator coils 54 and 94 is 3:4, and the three-phase AC power is output from the stator coils 54 and 94. An upper end shaft portion provided at the upper end portion 110T of the column 110 is provided with slip rings 110SA and 110SB, and the power generation output is taken from the stator coils 54 and 94 through brushes 102CA and 102CB sliding respectively on the slip rings 110SA and 110SB. The taken power generation output is connected to the output portion 10 through a wiring passing through an internal space of the tubular column (tower) 110.

Figure 8A:
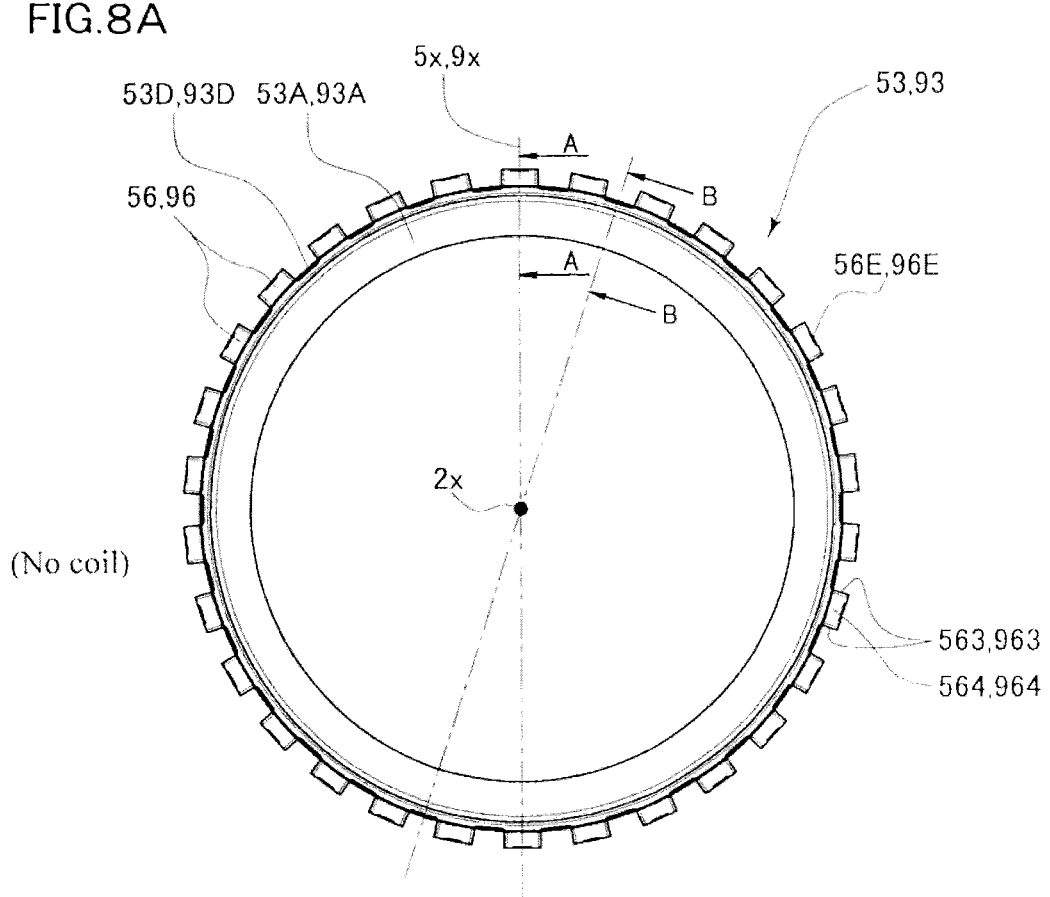
FIG. 8A is a front view of the stator of FIG. 7.
Figure 8B:
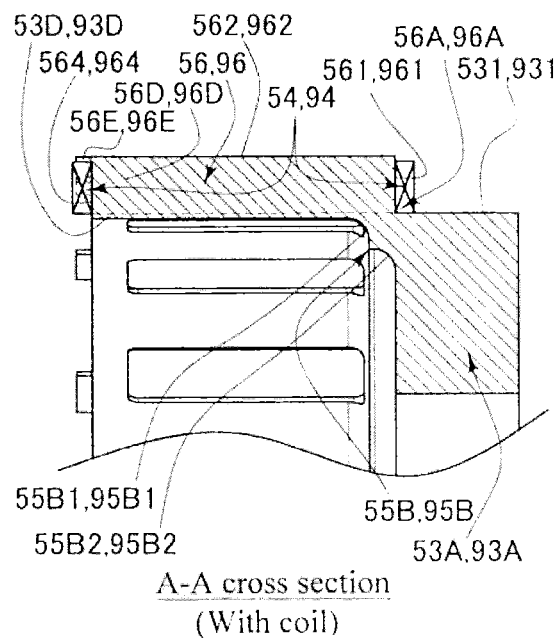
FIG. 8B is an A-A cross-sectional view of the stator of FIG. 8A.

The stators 53 and 93 in the first and second power generators 5 and 9 are provided as tubular members protruding from the power generation case body 100 toward the inside of the case along the shaft line direction of the rotation shaft 2. As shown in FIG. 7, in the tubular members 53 and 93, opening portions 57 and 97 penetrating in the radial direction are formed at predetermined intervals along the circumferential direction. The opening portions 57 and 97 are partitioned by column portions 56 and 96 provided in the circumferential direction and extending in the shaft line direction of the rotation shaft 2. As shown in FIG. 8B as the A-A cross-sectional view of FIG. 8A and FIG. 8C as the B-B cross-sectional view of FIG. 8A, the stator coils 54 and 94 are wound around the pillar portions 56 and 96. In the first embodiment, the winding directions are opposite between the adjacent pillar portions 56 and 96.

The stators 53 and 93 of the first embodiment will be described in detail.

The stators 53 and 93 of the first embodiment are formed as tubular members and have the same shape to have compatibility therebetween. The tubular members 53 and 93 are formed of a curable resin having heat resistance (for example, a thermosetting molding material mainly composed of an unsaturated polyester resin and constituted of a filler and a glass fiber). As shown in FIG. 6, the tubular members 53 and 93 are arranged so as to protrude in a tubular manner along the shaft line direction of the rotation shaft 2 toward the inside of the case from main rear surfaces (surfaces inside the case) 121B and 122B of main surfaces 121 and 122 respectively forming main front surfaces 121A and 122A exposed outside on the upstream side and the downstream side in the wind receiving direction 2w in the power generation case body 100.

Specifically, as shown in FIG. 6, the tubular members 53 and 93 are constituted to have fitting fixing portions 53A and 93A, the pillar portions 56 and 96, and tubular coupling portions 53D and 93D. The fitting fixing portions 53A and 93A are fixed in a fitting manner to annular fitting groove portions 121C and 122C provided on the main rear surfaces (surfaces inside the case) 121B and 122B of the main surface portions 121 and 122. The pillar portions 56 and 96 extend in the shaft line direction of the rotation shaft 2 so as to form a step in the radial direction at the fitting fixing portions 53A and 93A. The tubular coupling portions 53D and 93D couple in a tubular manner the pillar portions 56 and 96 at extending front end portions (end portions opposite to the main surface portions extending front end portions 121 and 122: see FIG. 8) 56D and 96D. The both ends of the pillar portions 56 and 96 are coupled by annular members (the fitting fixing portions 53A and 93A and the tubular coupling portions 53D and 93D), whereby the tubular members 53 and 93 have high strength. The tubular members 53 and 93 of the first embodiment are fastened and fixed to the main surface portions 121 and 122 in the fitting fixing portions 53A and 93A by fastening members (such as bolts) 109, 109.

As shown in FIGS. 7, 8A, 8B, and 8C, there are outer peripheral side vertical surfaces 561 and 961, rising outside in the radial direction from the outer peripheral surfaces 531 and 931, on the extending front end sides (the opposite sides to the fitting fixing portions 53A and 93A) of the outer peripheral surfaces 531 and 931 of the fitting fixing portions 53A and 93A. Thus, steps 56A and 96A are formed by the outer peripheral surfaces 531 and 931 of the fitting fixing portions 53A and 93A, the outer peripheral side vertical surfaces 561 and 961, and surfaces 562 and 962 outside in the radial direction of the pillar portions 56 and 96. On the other hand, the tubular coupling portions 53D and 93D are formed on the opposite side to the steps 56A and 96A in the pillar portions 56 and 96. The tubular coupling portions 53D and 93D extend to the adjacent pillar portions 56 and 96 so as to extend in the circumferential direction from the inner end portion in the radial direction of the extending front end portions 56D and 96D of the pillar portions 56 and 96 and form an annular shape as a whole. Thus, steps 56B and 96B (see FIG. 7) are formed by surfaces 562 and 962 outside in the radial direction of the pillar portions 56 and 96, side surfaces 563 and 963 in the circumferential direction of the extending front end portions 56D and 96D of the pillar portions 56 and 96, and surface 532 and 932 outside in the radial direction of the tubular coupling portions 53D and 93D extending in the circumferential direction from the inner end portion in the radial direction of the extending front end portions 56D and 96D of the pillar portions 56 and 96.

Figure 8C:
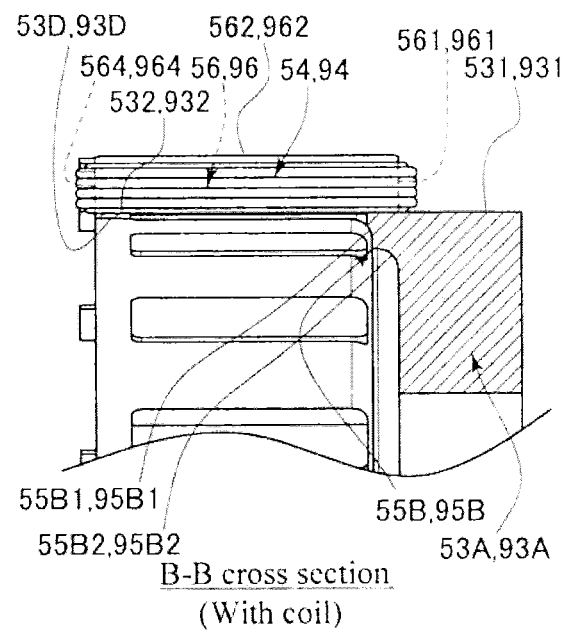
FIG. 8C is a B-B cross-sectional view of the stator of FIG. 8A.

The stator coils 54 and 94 of the first embodiment are annularly wound around the pillar portions 56 and 96 so as to have shaft lines 5x and 9x in the radial direction with respect to the shaft line 2x. In the embodiment, the stator coils 54 and 94 are wound into a quadrangular shape around the pillar portions 56 and 96 using the steps 56A, 96A, 56B, and 96B. Specifically, as shown in FIGS. 8A, 8B, and 8C, the stator coils 54 and 94 are wound around the pillar portions 56 and 96 so as to surround an annular surface formed by one end surfaces 561 and 961 in the extending direction of the pillar portions 56 and 96 (the shaft line direction of the rotation shaft 2), the other end surfaces 564 and 964, one side surfaces 563 and 963 in the circumferential direction of the pillar portions 56 and 96, and the other side surfaces 563 and 963. Then, the outer peripheral surfaces 531 and 931 of the fitting fixing portions 53A and 93A forming stepped lower surfaces in the steps 56A and 96A and the surfaces 532 and 932 outside in the radial direction of the tubular coupling portions 53D and 93D forming stepped lower surfaces in the steps 56B and 96B function as winding position regulating portions (winding position regulation unit) regulating the winding position inside in the radial direction with respect to the shaft line 2x of the rotation shaft 2 of the stator coils 54 and 94 wound around the pillar portions 56 and 96, whereby the stator coils 54 and 94 are stably wound around the pillar portions 56 and 96, respectively.

As shown in FIG. 8B, the pillar portions 56 and 96 have protrusions 56E and 96E further extending from the outer end portions in the radial direction of the extending front end portions 56D and 96D in the same direction as the extending direction of the extending front end portions 56D and 96D. The protrusions 56E and 96E function as winding position regulating portions (winding position regulation unit) regulating the winding position outside in the radial direction with respect to the shaft line 2x of the rotation shaft 2 of the stator coils 54 and 94 wound around the pillar portions 56 and 96, whereby the stator coils 54 and 94 are stably wound around the pillar portions 56 and 96, respectively. As described above, in the first embodiment, since the positions of the stator coils 54 and 94 are regulated inside and outside in the radial direction, it is possible to maintain the state that the stator coils 54 and 94 are stably wound around the pillar portions 56 and 96, and the winding operation by an operator is facilitated.

The rotor 51 of the first power generator 5 of the first embodiment will be described in detail.

Figure 9:
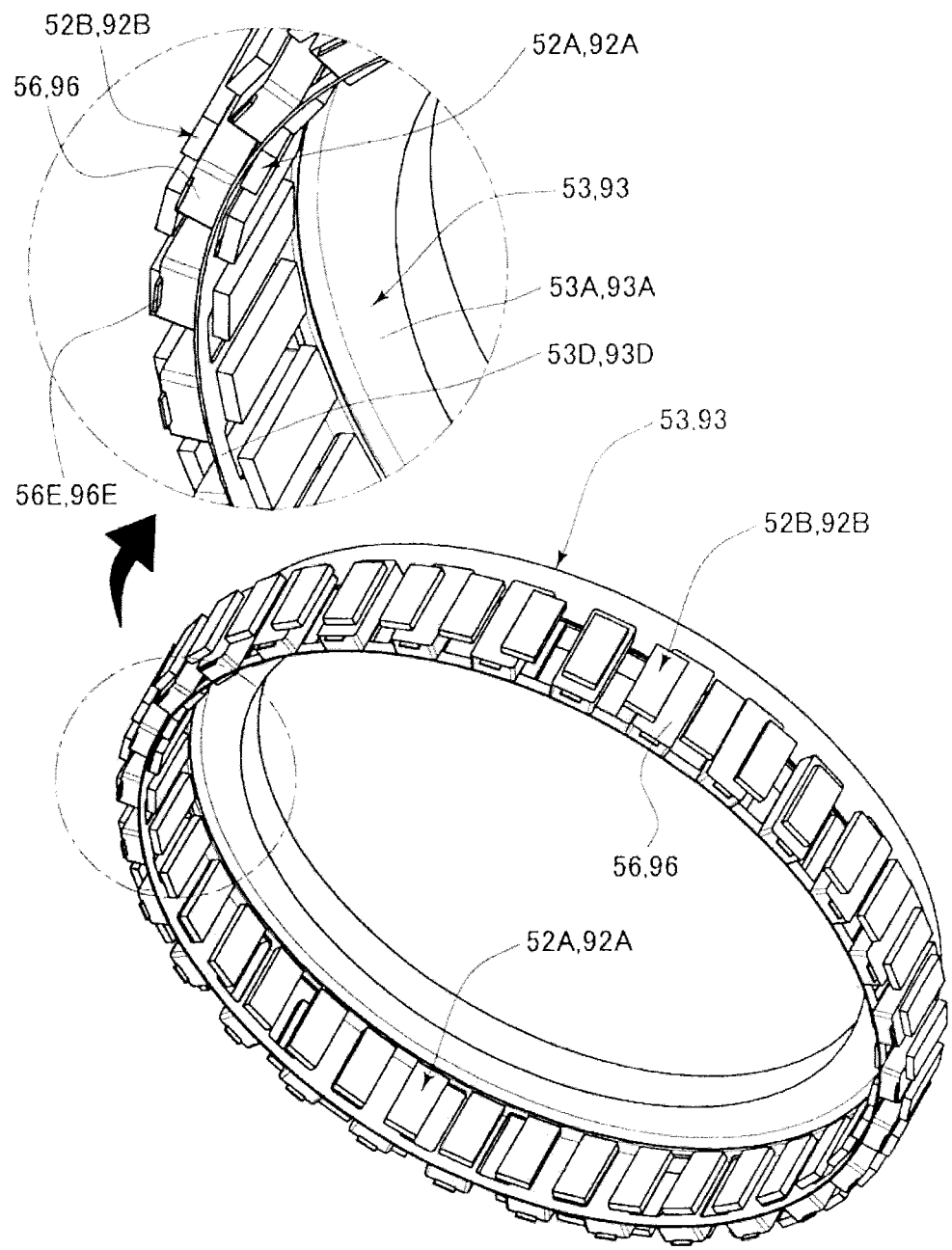
FIG. 9 is an oblique perspective view showing a positional relationship between the stator of FIG. 7 and magnetic members.
Figure 10:
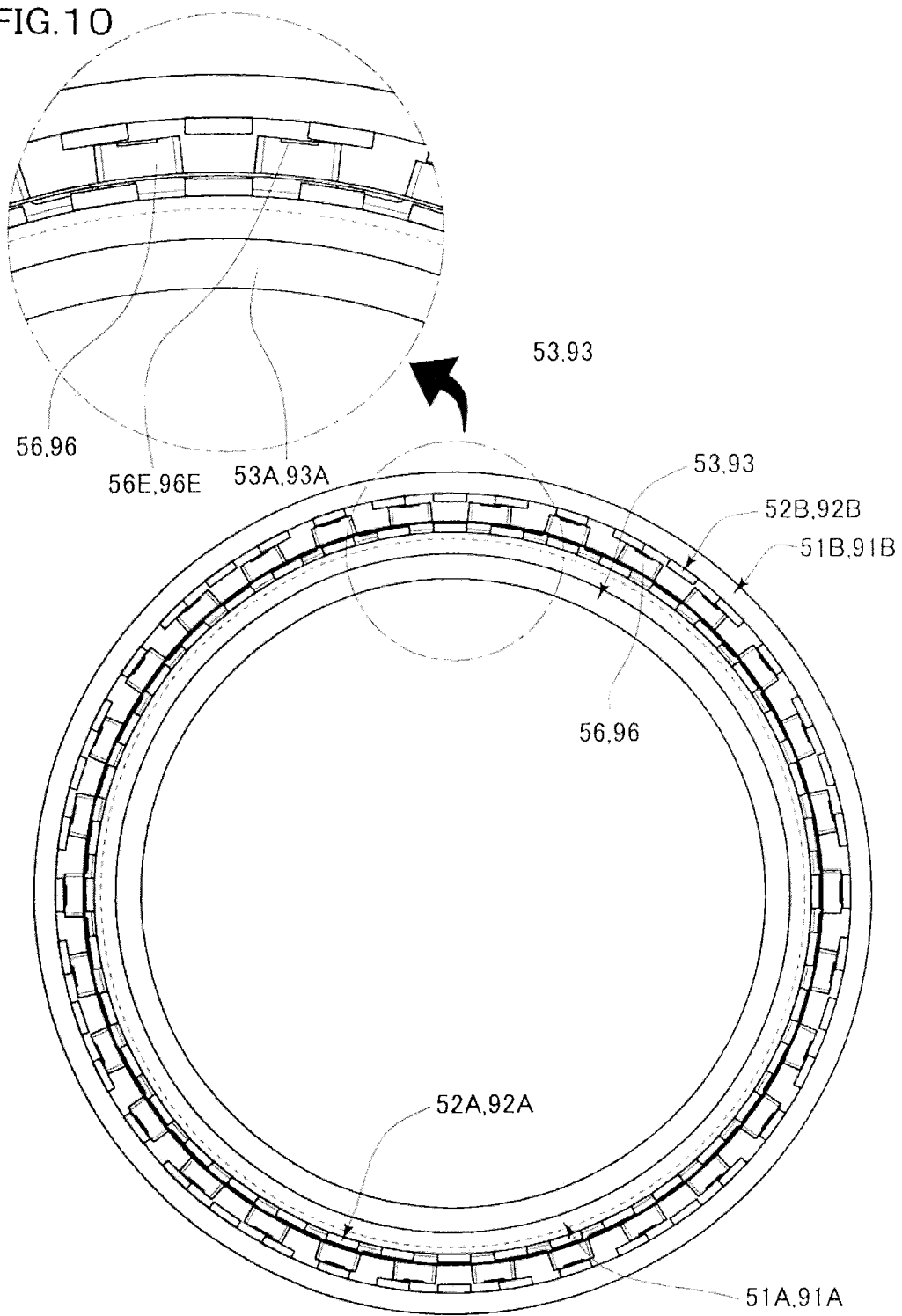
FIG. 10 is a front view and a partial enlarged view of the stator and the magnetic member of FIG. 9.

As shown in FIG. 6, the first power generator 5 of the first embodiment has as the rotor 51 a first rotor portion 51A and a second rotor portion 51B which are coaxial with the rotation shaft 2 and rotate integrally with each other. The rotor portions 51A and 51B have facing surfaces 51SA and 51SB facing each other through an air gap. The same number of the magnetic members 52 are arranged on the facing surfaces 51SA and 51SB at predetermined intervals in the circumferential direction and fixed by fastening members. However, among the rotor portions 51A and 51B, the magnetic member 52A (52) of the rotor portion 51A and the magnetic member 52B (52) of the rotor portion 51B face each other on magnetized surfaces having polarities (magnetic poles) different from each other as shown in FIG. 10. The stator coil 54 of the stator 53 is located in a gap between the first rotor portion 51A and the second rotor portion 51B. As shown in FIG. 9, a plurality of the stator coils 54 are arranged at predetermined intervals along the circumferential direction in an annular facing region on the stator 53 held between the magnetic members 52, 52 of the rotating rotor portions 51A and 51B.

In the first power generator 5, the first rotor portion 51A and the second rotor portion 51B are arranged to face in the radial direction with respect to the shaft line 2x of the rotation shaft 2. In the first embodiment, as shown in FIG. 6, as a main body of the rotor 51, there is provided with a rotor main body 50 having a shaft fixing portion 50C fixed to be rotated integrally with the rotation shaft 2, a disk-shaped intermediate portion 50B extending outside in the radial direction from the shaft fixing portion 50C, and an outer end portion 50A outside in the radial direction of the intermediate portions 50B. However, the rotor main body 50 is lighter than the flywheel 7 having a large weight on the outer peripheral side and has a smaller diameter. The cylindrical portion 51A forming the first rotor portion and the cylindrical portion 51B forming the second rotor portion and having a larger diameter than the cylindrical portion 51A are fixed to the outer end portion 50A so as to be coaxial with the rotor main body 50 and rotate integrally with the rotor main body 50. As described above, in the first embodiment, a single rotating body (the rotor main body 50) is just attached to the rotation shaft 2, whereby both the first rotor portion 51A and the second rotor portion 51B can be provided, and it is possible to provide a constitution simpler than the case where the first rotor portion 51A and the second rotor portion 51B as separate rotating bodies are fixed to the rotation shaft 2. The thickness of the intermediate portion 50B (the width in the shaft line direction of the rotation shaft 2) is smaller than the thickness of the fixing portion between the shaft fixing portion 50C on the inner peripheral side and the first rotor portion 51A of the outer end portion 50A.

In the first power generator 5 of the first embodiment, the outer end portion 50A of the rotor main body 50 is constituted to comprise an inner peripheral side fixing portion 50A1 for fixing the inner peripheral side cylindrical portion 51A forming the first rotor portion and an outer peripheral side fixing portion 50A2 for fixing the outer peripheral side cylindrical portion 51B forming the second rotor portion. The inner peripheral side fixing portion 50A1 has a cylindrical shape projecting in the shaft line direction of the rotation shaft 2. On the other hand, the outer peripheral side fixing portion 50A2 has a shape extending so as to be continued in the radial direction from the intermediate portion 50B.

In the first power generator 5, the cylindrical portion 51A forming the first rotor portion comprises a tubular fitting portion 51A1, which is fitted in the outer peripheral side of the cylindrical inner peripheral side fixing portion 50A1 of the rotor main body 50, and an annular abutting portion 51A2 extending inward in the radial direction from an end portion of the fitting portion 51A1 so as to be abutted against an extending front end surface of the inner peripheral side fixing portion 50A1. The outer peripheral surface of the tubular fitting portion 51A1 is an arrangement surface 51SA of the magnetic members 52. On the other hand, the annular abutting portion 51A2 functions as a fixing portion with the rotor main body 50 (inner peripheral side fixing portion 50A1). Specifically, the cylindrical portion 51A forming the first rotor portion is fastened and fixed to the inner peripheral side fixing portion 50A1 of the rotor main body 50 by a fastening member 106A at a plurality of portions in the circumferential direction of the abutting portion 51A2.

The cylindrical portion 51B forming the second rotor portion in the first power generator 5 has a cylindrical shape as a whole. One end portion 51B2 of the cylindrical portion 51B forms a fixing portion fixed so that the front end surface is abutted against an outer peripheral side region on a surface of the outer peripheral side fixing portion 50A2 of the rotor main body 50, on which the inner peripheral side fixing portion 50A1 extends. The other end portion 51B1 side faces, in the radial direction, the outer peripheral surface of the fitting portion 51A1 of the cylindrical portion 51A whose inner peripheral surface forms the first rotor portion, and the inner peripheral surface is the arrangement surface 51SB of the magnetic member 52. The cylindrical portion 51B forming the second rotor portion is fastened and fixed to the outer peripheral side fixing portion 50A2 of the rotor main body 50 by a fastening member 106B at a plurality of portions in the circumferential direction of one end portion 51B2.

As shown in FIGS. 8B and 8C, an annular curved surface concaved on the side on which it is separated from the first rotor portion 51 in the shaft line direction of the rotation shaft 2 is formed at an annular corner portion 55B formed between a side surface opposite to the main surface portion 121 side of the power generation case body 100 on the fitting fixing portion 53A side of the stator 53 and the inner peripheral surface of the pillar portion 56 so that the curved surface is not contacted with the inner peripheral side first rotor portion 51. The corner portion 55B is close to the inner peripheral side cylindrical portion 51A forming the first rotor portion and the magnetic member 52 fixed and installed on the outer peripheral surface, and two curved surface 55B1 and 55B2 on which both the proximate portions are concaved in a direction far away therefrom are adjacently formed so as not to be in contact with the inner peripheral side cylindrical portion 51A and the magnetic member 52.

The rotor 91 of the second power generator 9 of the first embodiment will be described in detail.

As shown in FIG. 6, the second power generator 9 of the first embodiment has as the rotor 91 a first rotor portion 91A and a second rotor portion 91B which are coaxial with the rotation shaft 2 and rotate integrally with each other along with the flywheel 7. The rotor portions 91A and 91B have facing surfaces 91SA and 91SB facing each other through an air gap. The same number of the magnetic members 92 are arranged at predetermined intervals on the facing surfaces 91SA and 91SB in the circumferential direction and fixed by fastening members. However, as shown in FIG. 10, among the rotors 91A and 91B, the magnetic member 92A (92) of the rotor portion 91A and the magnetic member 92B (92) of the rotor portions 91B face each other on magnetized surfaces having polarities (magnetic poles) different from each other. The stator coil 94 of the stator 93 is located in a gap between the first rotor portion 91A and the second rotor portion 92A. As shown in FIG. 9, a plurality of the stator coils 94 are arranged at predetermined intervals along the circumferential direction in an annular facing region on the stator 93 held between the magnetic members 92 of the rotating rotors 91A and 91B.

In the second power generator 9, the first rotor portion 91A and the second rotor portion 91B are arranged to face in the radial direction with respect to the shaft line 2x of the rotation shaft 2. As shown in FIG. 6, the first rotor portion 91A is fixed to the fixing portion 90A formed at an intermediate portion on the outer peripheral side of the flywheel 7 (or may be formed at the outer peripheral end portion) so that the cylindrical portion 91A forming the first rotor portion and the cylindrical portion 91B forming the second rotor portion and having a diameter larger than the cylindrical portion 91A are coaxial with the flywheel 7 and rotate integrally with the flywheel 7. In this case, a single rotating body (flywheel 7) is just attached to the rotation shaft 2, whereby the first rotor portion 91A and the second rotor portion 91B can be provided, and it is possible to provide a constitution simpler than the case where the first rotor portion 91A and the second rotor portions 91B as separate rotating bodies are fixed to the rotation shaft 2.

The flywheel 7 of the first embodiment has the shaft fixing portion 70C fixed to the rotation shaft 2 through the one-way clutch 6, the disk-shaped intermediate portion 70B extending outside in the radial direction from the shaft fixing portion 70C, and the fixing portion 70A outside in the radial direction of the intermediate portion 70B. In the first embodiment, the flywheel 7 further has the outer end portion 70D extending outside in the radial direction from the fixing portion 70A, whereby the flywheel 7 has a diameter and weight larger than the rotor main body 50 and functions as rotational energy storage unit. The thickness (the width in the shaft line direction of the rotation shaft 2) of the intermediate portion 70B is smaller than the thickness of the shaft fixing portion 700 on the inner peripheral side and the fixing portion 70A and the outer end portion 70D on the outer peripheral side. Particularly, the thickness and weight of the fixing portion 70A and the outer end portion 70D are larger than those of the intermediate portion 70B, whereby a larger centrifugal force is applied to the outer peripheral side on which the rotor 91 is formed.

In the second power generator 9 of the first embodiment, the fixing portion 70A of the flywheel 7 is constituted to comprise the inner peripheral side fixing portion 70A2 for fixing the inner peripheral side cylindrical portion 91A forming the first rotor portion and the outer peripheral side fixing portion 70A1 for fixing the outer peripheral side cylindrical portion 91B forming the second rotor portion.

In the second power generator 9, the cylindrical portion 91A forming the first rotor portion and the cylindrical portion 91B forming the second rotor portion have a cylindrical shape as a whole. The respective end portions 91A2 and 91B2 of the cylindrical portions 91A and 91B form fixing portions fixed so that a front end surface is abutted against a surface of the fixing portion 70A (70A1 and 70A2) of the flywheel 7 that is opposite to the first power generator 5. Among the other end portions 91A1 and 91B1, on the end portion 91A1 side, the outer peripheral surface 91SA faces, in the radial direction, the inner peripheral surface 91SB of the cylindrical portion 91B forming the second rotor portion, and on the end portion 91B1 side, the inner peripheral surface 91SB faces, in the radial direction, the outer peripheral surface 91SA of the cylindrical portion 91A forming the first rotor portion, and the outer peripheral surface 91SA and the inner peripheral surface 91SB are arrangement surfaces of the magnetic members 92, 92. The fixing portions 70A1 and 70A2 of the flywheel 7 are fitting groove portions having an annular groove formed on a surface opposite to the first power generator 5 and concaved in the shaft line direction of the rotation shaft 2, and the end portions 91A2 and 91B2 of the cylindrical portions 91A and 91B forming the first rotor portion and the second rotor portion, respectively are fitted in the fitting groove portions 70A1 and 70A2. In the cylindrical portion 91A forming the first rotor portion and the cylindrical portion 91B forming the second rotor portion, the end portions 91A2 and 91B2 are fitted in the annular grooves of the fitting groove portions 70A1 and 70A2, and the cylindrical portions 91A and 91B are fastened and fixed to the fixing portion 70A of the flywheel 7 by the fastening members 107A and 107B at a plurality of portions in the circumferential direction of the end portions 91A2 and 91B2.

An annular curved surface concaved on the side on which it is separated from the first rotor portion 91 in the shaft line direction of the rotation shaft 2 is formed at an annular corner portion 95B, formed between a side surface opposite to the main surface portion 122 side of the power generation case body 100 on the fitting fixing portion 93A side of the stator 93 and the inner peripheral surface of the pillar portion 96, so as not to be contacted with the first rotor portion 91 on the inner peripheral side. The inner peripheral side cylindrical portion 91A forming the first rotor portion and the magnetic member 92 fixed and installed on the outer peripheral surface are adjacent at the corner portion 95B, and two curved surface 95B1 and 95B2 on which both the proximate portions are concaved in a direction far away therefrom are adjacently formed so as not to be in contact with the inner peripheral side cylindrical portion 91A and the magnetic member 92.

A shown in FIG. 5, the column 110 is fixed to the lower end portion 102 of the power generation case body 100 storing the power generators 5 and 9 and the flywheel 7. The power generation case body 100 is fixed to the nacelle 21.

As described above, the power generation case body 100 is rotatable with the nacelle 21 according to the wind direction at the upper end portion 110T of the column (tower) 110 extending from the earth's surface. The nacelle 21 has at its lower end a lower end opening 21H vertically penetrating within and without. A column fixing portion 102C fixed to the lower end portion 102 (102A and 102B) of the power generation case body 100 is arranged so as to perpetrate through the lower end opening 21H and protrude outside the nacelle 21. The column fixing portion 102C has a tubular opening opened at the lower end, and the power generation case body 100 side is incorporated so as to be rotatable around the column shaft line 110x with respect to the column 110 in the form that the upper end portion 110T of the column 110 is inserted through the opening and a bearing device 63 is interposed between the column fixing portion 102C and the upper end portion 110T of the column 110. The brushes 102CA and 102CB are attached to the column fixing portion 102C of the power generation case body 100, and the slip rings 110SA and 110SB are attached to the shaft portion 110TA of the column upper end portion 110T so as to slide with the brushes 102CA and 102CB. The electric powers generated by the power generators 5 and 9 are output to the output portion 10 through the brushes 102CA and 102CB and the slip rings 110SA and 110SB.

As shown in FIG. 5, the lower end portion 102 (102A and 102B) of the power generation case body 100 is fixed integrally with the column fixing portion 102C. The power generation case body 100 in the first embodiment has a shape that has small diameter cylindrical outer peripheral wall portions 129 and 125 forming the outer peripheral walls of the upstream storage space 9S and the downstream storage space 5S and a cylindrical outer peripheral wall portion 127 forming the outer peripheral wall of the intermediate storage space 7S between the outer peripheral wall portions 129 and 125 and having a diameter larger than the outer peripheral wall portions 129 and 125. The column fixing portion 102C has holding portions 102G and abutting portions 102S, 102S. The holding portions 102G hold therebetween a lower end protrusion of the large diameter cylindrical outer peripheral wall portion 127 from both sides in the shaft line direction of the rotation shaft 2. The abutting portions 102S, 102S extend at the upper end of those holding portions 102G in the opposite direction to the direction, where the abutting portions 102S face each other, in the shaft line direction of the rotation shaft 2, and lower end surfaces of the small diameter cylindrical outer peripheral wall portions 129 and 125 are abutted against each other by the abutting portions 102S. The column fixing portion 102C is fastened and fixed to the lower end protrusion of the cylindrical outer peripheral wall portion 127 in the holding portion 102G by fastening members 108, 108.

As shown in FIG. 5, the power generation case body 100 of the first embodiment is divided into an upstream case body 100A and a downstream case body 100B at an intermediate position of the intermediate storage space 7S in the wind receiving direction 2w (the shaft line direction of the rotation shaft 2). The positions of the case bodies 100A and 100B are aligned, and the case bodies 100A and 100B are adhered to each other. Upper end portions 101A and 101B and lower end portions 102A and 102B of the case bodies 100A and 100B are fastened and fixed by fastening members (bolts) 103. On the other hand, the nacelle 21 has fixing plate portions 210, 210 holding therebetween the upper and lower end portions 101 (101A and 101B) and 102 (102A and 102B) of the case bodies 100A and 100B in an adhesive state on the upstream side and the downstream side in the wind receiving direction 2w. The fixing plate portions 210, 210 and the upper and lower end portions 101 (101A and 101B) and 102 (102A and 102B) of the case bodies 100A and 100B in an adhesive state held between the fixing plate portions 210 are fastened and fixed by the fastening members 103, whereby the power generation case body 100 is fixed to the nacelle 21. The fixing plate portion 210 of the first embodiment is a plate material bent into an L shape and has a horizontal portion and a drooping portion. The horizontal portion is fixed to the inner upper end surface of the nacelle 21. The drooping portion extends downward along peripheral side surfaces of the upper and lower end portions 101 and 102 of the case bodies 100A and 100B from the end portion of the horizontal portion, and the fastening member 103 inserts through the drooping portion.

Hereinabove, although the first embodiment of the invention has been described, the first embodiment is just an example, and the invention is not limited thereto but can be variously modified based on the knowledge of those skilled in the art without departing from the scope of claims. Hereinafter, embodiments different from the above embodiment will be described. However, the common components are assigned the same reference numerals as those of the above embodiment, and descriptions thereof are omitted.

Hereinafter, a second embodiment of the invention will be described.

Figure 11:
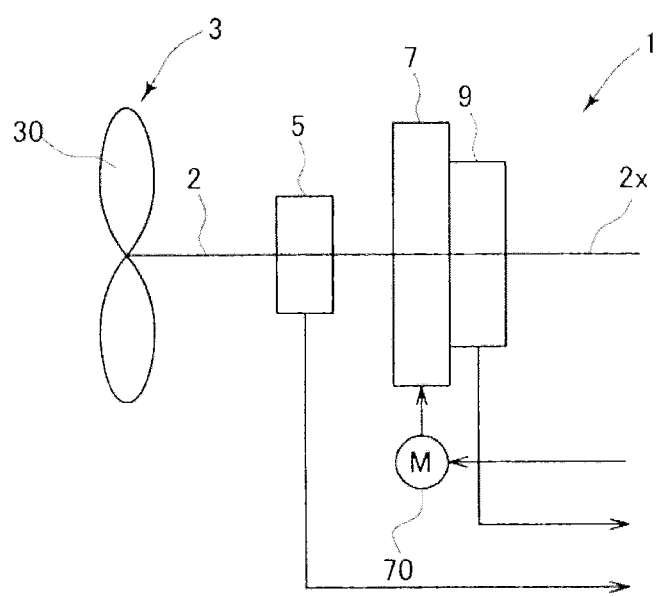
FIG. 11 is a block diagram showing in a simplified manner an electrical configuration of the wind power generator of the second embodiment in the invention.

Although a wind power generator of the second embodiment has a constitution similar to that in FIGS. 1 and 4, the configuration of the block diagram is different from FIG. 2 and shown in FIG. 11. The constitution of the output portion 10 is different from FIGS. 3A and 3B and shown in FIGS. 12A and 12B. The constitution in the power generation case body 100 is different from FIGS. 5 and 6 and shown in FIGS. 13 and 14. The constitution and arrangement of the stators 53 and 93 and the stator coils 54 and 94 and the magnetic members 52 and 54 in the power generators 5 and 9 are the constitutions shown in FIGS. 7 to 10.

Figure 12A:
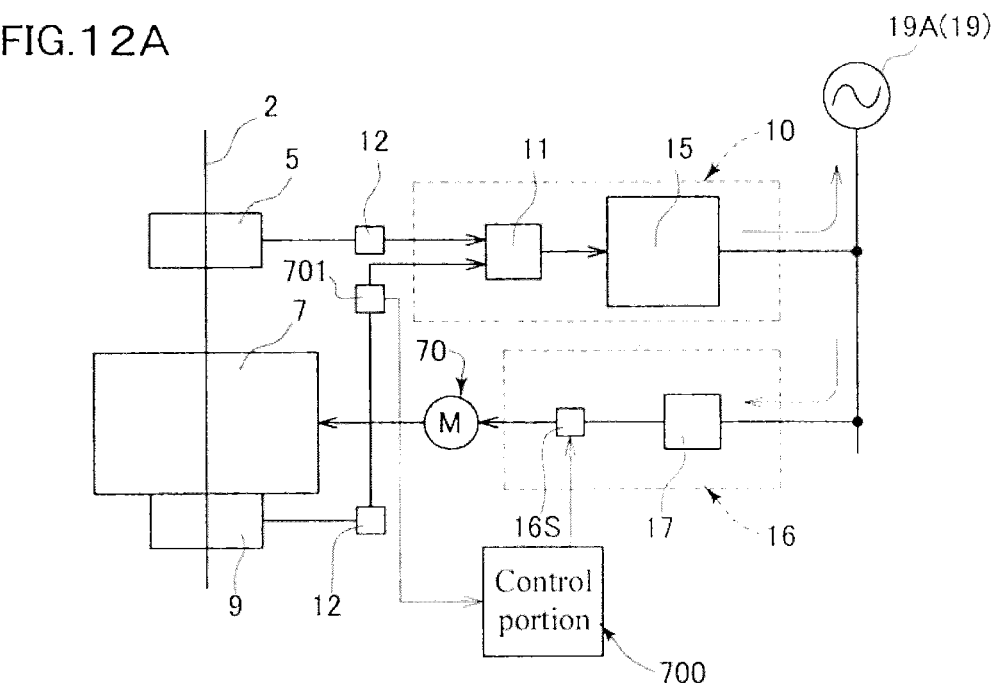
FIG. 12A is an example of a block diagram showing in a simplified manner an electrical configuration of an output portion and a drive electric power supply portion of the wind power generator of the second embodiment.
Figure 12B:
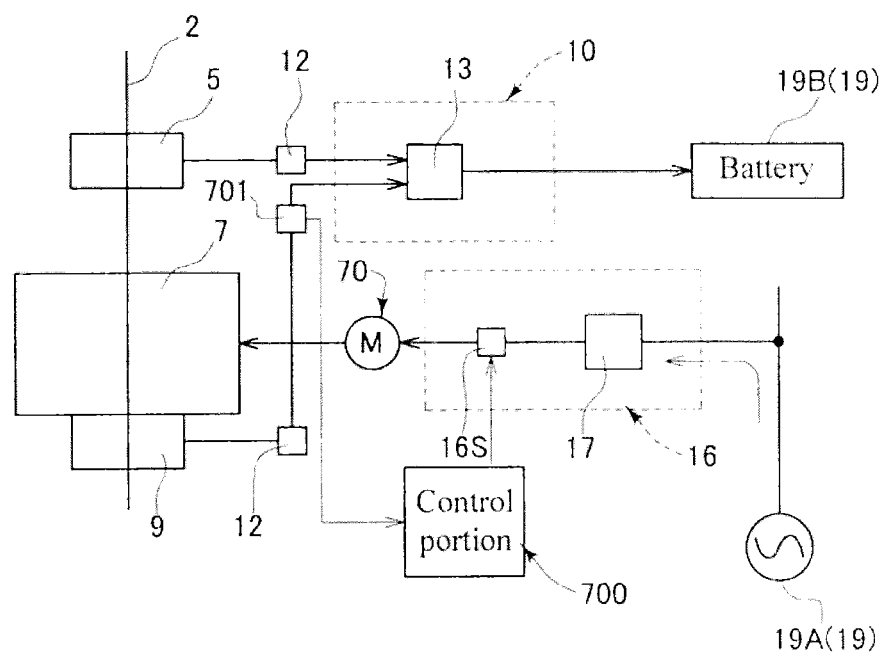
FIG. 12B is a second example of a block diagram showing in a simplified manner an electrical configuration of the output portion and the drive electric power supply portion of the wind power generator of the second embodiment.

Specifically, the wind power generator 1 of the second embodiment is constituted to comprise the windmill 3, the first power generator (power generation unit) 5, the flywheel 7, and the second power generator (power generation unit) 9 in the first embodiment and, as shown in FIGS. 11, 12A, and 12B, further comprise an electric motor (that is, an electric motor assisting the rotation in the constant direction of the flywheel 7 and herein a motor: electric drive unit) 70, a drive electric power supply portion (drive electric power supply unit) 16, a rotational speed level detecting portion (rotational speed level detection unit) 701, and a control portion (drive electric power control unit) 700. The electric motor 70 rotates and drives the flywheel 7 in the same direction as the rotational direction (the constant rotational direction) of the rotation shaft 2 in the case where the windmill 3 receives the wind. A drive electric power supply portion 16 supplies the drive electric power to the electric motor 70. The rotational speed level detecting portion 701 detects the rotational speed level of the flywheel 7. When the rotational speed level detected by the rotational speed level detecting portion 701 is less than a previously determined threshold rotational speed level, the control portion 700 makes the drive electric power supply unit supply the drive electric power to the electric drive unit.

Figure 25:
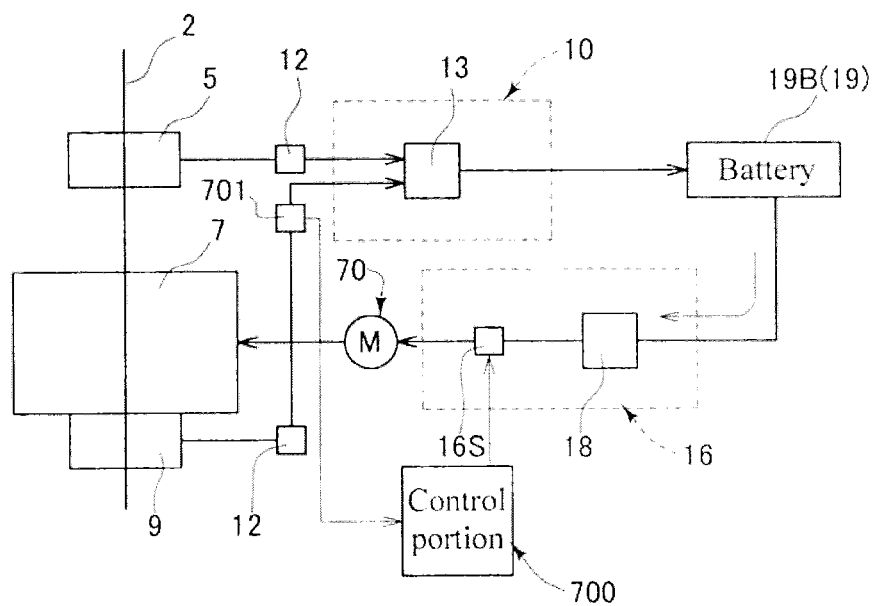
FIG. 25 is a sixth variation of the block diagram showing in a simplified manner an electrical configuration of the output portion and the drive electric power supply portion in the wind power generator of the second embodiment.

As shown in FIGS. 12A and 12B, in the drive electric power supply portion 16, three-phase AC powers input from an external device is input to an inverter 17 for three-phase AC powers to be converted into electric power for excitation (drive electric power) of the electric motor (three-phase AC motor) 70 and, thus, to be output to the stator coil 74 of the electric motor 70. In the embodiment shown in FIGS. 12A and 12B, the drive electric power for the electric motor 70 based on the electric power supplied from the external power supply system 19A is supplied to the electric motor 70. Namely, the electric power supplied from the external power supply system 19A is converted into the drive electric power for the electric motor 70 to be supplied to the electric motor 70. As a variation of the second embodiment, as shown in FIG. 25, in the drive electric power supply portion 16, the drive electric power for the electric motor 70 based on the electric power supplied from an external battery (storage unit) 19B may be supplied to the electric motor 70. Namely, the DC Power supplied from the external battery 19B is converted into the drive electric power for excitation for rotating and driving the electric motor (three-phase AC motor) 70 through an inverter 18, for example, whereby the DC power is converted into the drive electric power for the electric motor 70 and may be supplied to the electric motor 70.

The wind power generator 1 of the second embodiment is constituted to further comprise an output portion (output unit) 10 which receives input of any one or both the electric powers generated by the first power generator 5 and the second power generator 9 and outputs the input electric power to an external device 19. In order to stabilize the output electric power, the output portion 10 in the embodiment is constituted such that the electric power generated by at least the second power generator 9 is input to the output portion 10 to be output externally. For example, as shown in FIGS. 12A, 12B, and FIG. 25, the output portion 10 can be constituted to comprise the output portion (output unit) 10 which receives both the inputs of the electric powers generated by the first power generator 5 and the second power generator 9 and externally output the electric powers together. Namely, output lines of the electric powers generated by the first power generator 5 and the second power generator 9 are connected until reaching an external output, and the electric powers can be externally output by one system.

Namely, in the constitution of FIGS. 12A, 12B, and 25 in the second embodiment, the output portion 10 outputs all the electric powers, generated by both the first power generator 5 and the second power generator 9, together to the external device 19 (the external power supply system 19A and the battery 19B), and not the electric powers generated by the first power generator 5 and the second power generator 9 but the drive electric power for the electric motor 70 based on the electric power supplied from the external device 19 (the external power supply system 19A and the battery 19B) is supplied to the electric motor 70 by the drive electric power supply portion 16.

The output portion 10 of FIG. 12A inputs the three-phase AC powers generated by the first power generator 5 and the second power generator 9 to rectifiers 12 to be input to a step-up controller 11, and, thus, to be output at a predetermined voltage. The output is further input to a power conditioner 15, and the input DC power is converted into a system power to be output externally. According to this constitution, the electric powers generated by the first power generator 5 and the second power generator 9 can be supplied together to the external power supply system 19A, and the electric power, for example, may be sold. Alternatively, the power conditioner 15 converts the electric power into AC power that can be used at home, and the AC power may be output externally. Further, in the output portion 10 of FIGS. 12B and 23, the electric powers generated by the first power generator 5 and the second power generator 9 are input to the rectifiers 12 to be input to a step-up controller 13, and the DC power with a predetermined voltage is supplied to the battery (storage unit) 19B and may be stored therein. Further, the electric power stored in the battery (storage unit) 19B may be supplied to the external power supply system 19A through the power conditioner 15. The power supply system 19A and the battery (storage unit) 19B are included in the power supply 19 provided outside the apparatus.

Figure 18:
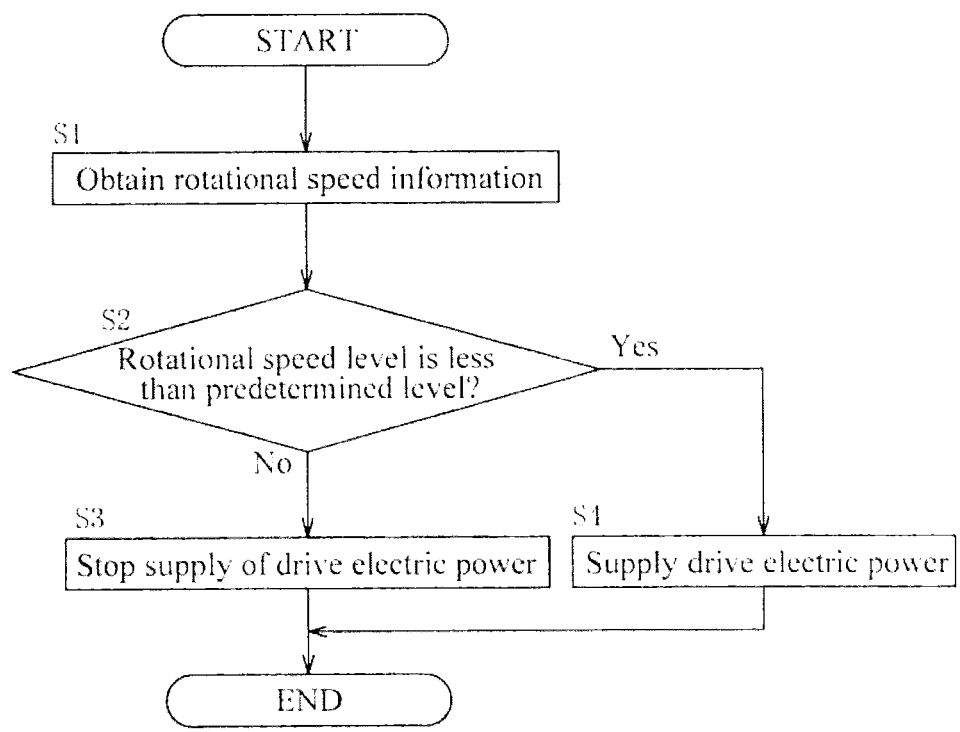
FIG. 18 is a first example of a flowchart showing a flow of a drive electric power supply control to the electric motor.

The control portion 700 is constituted as a well-known microcomputer comprising CPU, ROM, and RAM. A storage portion such as ROM stores various control programs, control parameters, and so on, and the CPU performs control using them. The control portion 700 of the second embodiment is connected to the rotational speed level detecting portion (rotational speed level detection unit) 701 and executes drive electric power supply control for the electric motor 70 as shown in FIG. 18 so that the CPU executes the control program stored in the storage portion such as ROM. Specifically, the control portion 700 obtains a value, reflecting the rotational speed level of the flywheel 7, from the rotational speed level detecting portion (rotational speed level detection unit) 701 (S1). When the rotational speed level shown by the obtained value is less than a threshold rotational speed level stored in the storage portion such as ROM (S2: Yes), an electric power supply switching portion (changeover switch) 16S of the drive electric power supply portion 16 is switched to the supply side, and the drive electric power is supplied to the electric motor 70 (S4). On the other hand, when the rotational speed level shown by the obtained value is not less than the threshold rotational speed level (S2: No), the electric power supply switching portion (changeover switch) 16S of the drive electric power supply portion 16 is switched to a cutting-off side to cut off/stop the supply of the drive electric power to the electric motor 70 (S3). The case where the rotational speed level shown by the obtained value is less than the threshold rotational speed level can include the case where the rotation of the flywheel 7 is stopped or the case where the flywheel 7 rotates at extremely low speed.

Figure 24:
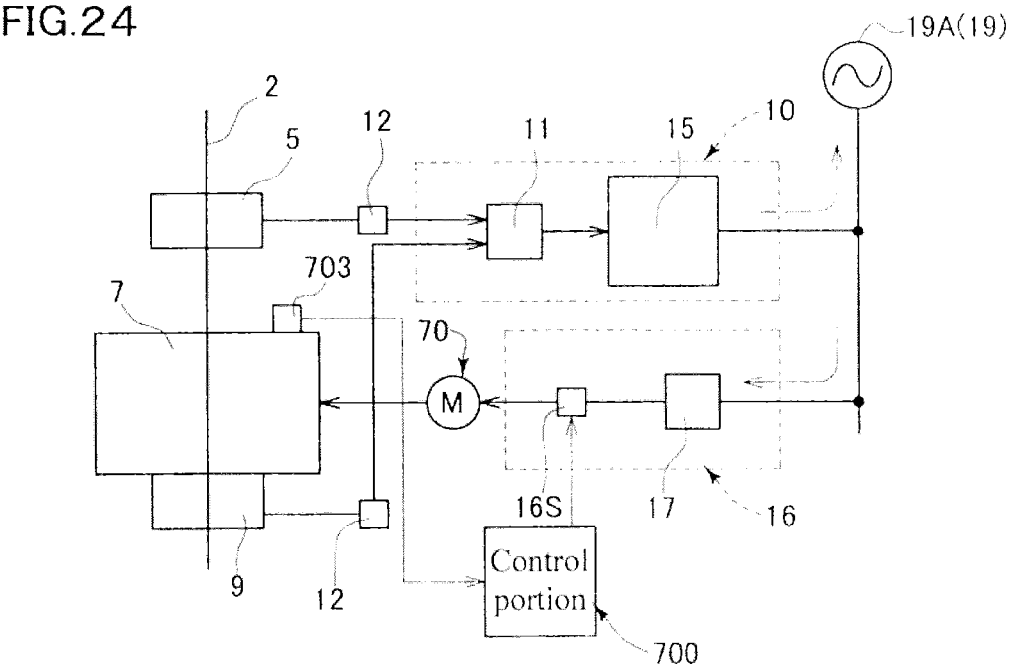
FIG. 24 is a fifth variation of a block diagram showing in a simplified manner an electrical configuration of the output portion and the drive electric power supply portion in the wind power generator of the second embodiment.

Although the rotational speed level detecting portion 701 of the second embodiment is provided as a well-known ammeter which detects a current value of the electric power generated by the second power generator 9 by utilizing that the rotational speed of the flywheel 7 reflects in the electric power generated by the second power generator 9, the rotational speed level detecting portion 701 may directly detect the rotational speed of the flywheel. For example, as shown in FIG. 24, instead of the ammeter 701 as the rotational speed level detecting portion, a well-known magnetic or optical rotation sensor (for example, rotary encoder) 703 detecting the rotational speed of the flywheel may be provided.

The electric motor 70 of the second embodiment will be described in detail.

Figure 14:
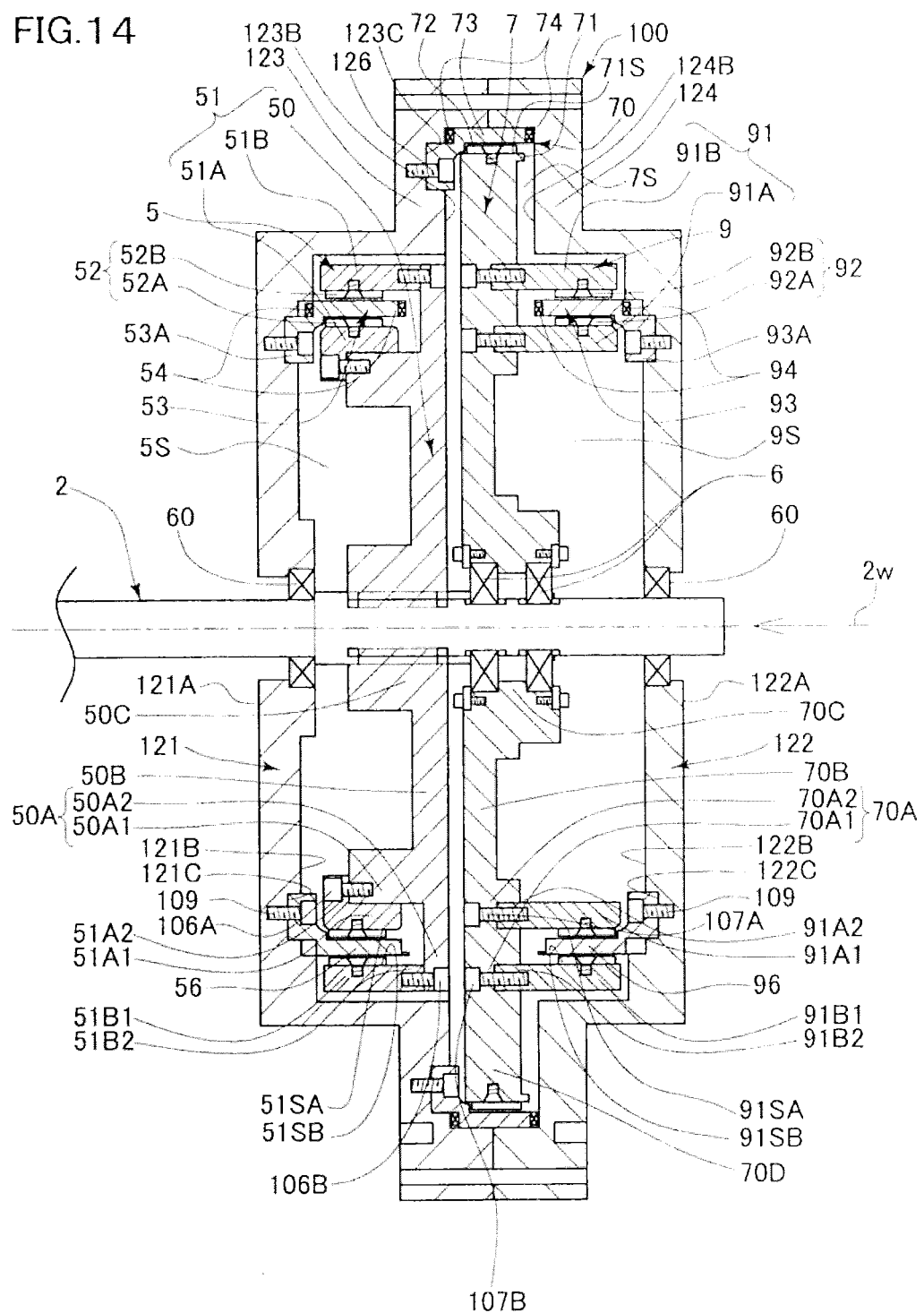
FIG. 14 is an enlarged cross-sectional view of the inside of a power generation case body in the wind power generator of the second and third embodiments.

As shown in FIG. 11, the electric motor 70 is a motor rotating and driving the flywheel 7 in a constant rotational direction and is driven by the drive electric power supplied from the drive electric power supply portion 16. As shown in FIG. 14, the electric motor 70 is constituted to comprise a stator (motor stator) 73. A plurality of magnetic members 72 are arranged at predetermined intervals along the circumferential direction of a rotor (motor rotor) 71 rotatable around the rotation shaft 2, and in the stator 73, a stator coil 74 which faces the magnetic members 72 so as to form an air gap and is irrotational with respect to the rotor 72 is arranged. The magnetic member 72 in the embodiment is a permanent magnet, and a neodymium magnet can be used, for example. However, an electromagnet may be used instead of the permanent magnet. When an excitation current is supplied from the drive electric power supply portion 16 to the stator coil 74, the electric motor 70 rotates and drives the flywheel 7 in the constant rotational direction to increase the rotational speed. The larger the electric power to be supplied (generated electric power), the larger the rotation drive force of the electric motor 70. Namely, the larger the electric power generated by the first power generator 5, the larger the rotation drive force of the electric motor 70.

In the embodiment, a ratio of the number of the magnetic members 72 to the number of the stator coils 74 is 3:4, and the three-phase AC power as the drive electric power is input to the stator coil 74. The drive electric power supply portion 16 is provided inside the nacelle 21.

In the embodiment, the second power generator 9 and the electric motor 70 are provided integrally with the flywheel 7. In the flywheel 7, the rotor 71 (72) and the stator 73 (coil 74) of the electric motor 70 are located on the outer peripheral side than the rotor 91 (magnetic member 92) and the stator 93 (coil 94) of the second power generator 9.

The stator 73 in the electric motor 70 is provided in the power generation case body 100. In the embodiment, as shown in FIG. 14, the stator 73 is a tubular member and is arranged and fixed integrally so as to be close to an inner peripheral surface of a cylindrical outer peripheral wall portion 127 forming an outer peripheral wall of an intermediate storage space 7S storing the flywheel 7 in the power generation case body 100 and having a larger diameter than the sides of the first and second power generators 5 and 9. The stator 73 of the embodiment has a shape similar to those of the stators 53 and 93 of the power generators 5 and 9. Specifically, as shown in FIG. 15, in the stator 73, openings 77 penetrating in the radial direction are formed at predetermined intervals along the circumferential direction and partitioned by pillar portions 76 provided in the circumferential direction and protruding inward in the radial direction of the rotation shaft 2. The stator coil 74 is wound around the pillar portions 76, and in the embodiment, the winding directions are opposite between the adjacent pillar portions 76. The stator 73 of the electric motor 70 has a tubular shape having a larger diameter than the stators 53 and 93 of the power generators 5 and 9.

The tubular stator 73 of the embodiment is formed of a curable resin having heat resistance (for example, a thermosetting molding material mainly composed of an unsaturated polyester resin and constituted of a filler and a glass fiber etc.). As shown in FIG. 14, the stator 73 is arranged so as to protrude in a tubular manner along the shaft line direction of the rotation shaft 2 from one of main rear surfaces (surfaces inside the case) 123B and 124B of annular side wall portions 123 and 124, covering the outer peripheral side of the intermediate storage space 7S of the power generation case body 100 on the upstream side and the downstream side in the wind receiving direction 2w, toward the other main rear surface.

Specifically, as shown in FIG. 15, the tubular stator 73 shown in FIG. 14 is constituted to have a fitting fixing portion 73A, the pillar portions 76, and a tubular coupling portion 73D. The fitting fixing portion 73A is fixed so as to be fitted in an annular fitting groove portion 123C provided in one of the main rear surfaces (the surfaces inside the case) 123B and 124B (the main rear surface 123B in the embodiment) of the annular side wall portions 123 and 124. The pillar portion 76 extends in the shaft line direction of the rotation shaft 2 so as to form a step in the radial direction at the fitting fixing portion 73A. The tubular coupling portion 73D couples in a tubular manner the pillar portions 76 at an extending front end portion (an end portion on the main rear surface 123B side: see FIGS. 16B and 16C) 76D. The both ends of the respective pillar portions 76 are coupled by the annular member (the fitting fixing portion 73A and the tubular coupling portion 73D), whereby the tubular stator 73 has high strength. The tubular member 73 of the embodiment is fastened and fixed to one of the annular side wall portions 123 and 124 in the fitting fixing portion 73A by a fastening member (such as a bolt) 126.

As shown in FIGS. 15, 16A, 16B, and 16C, an outer peripheral side vertical surface 761 rising outside in the radial direction from the outer peripheral surface 731 is provided on the extending front end side (the opposite side to the fitting fixing portion 73A) of the outer peripheral surface 731 of the fitting fixing portion 73A. Thus, a step 76A is constituted by the outer peripheral surface 731 of the fitting fixing portion 73A, the outer peripheral side vertical surface 761, and a surface 762 outside in the radial direction of the pillar portion 76. On the other hand, the tubular coupling portion 73D is formed on the opposite side to the steps 76A of the pillar portions 76. The tubular coupling portion 73D extends to the adjacent pillar portions 76 so as to extend in the circumferential direction from the inner end portion in the radial direction of the extending front end portion 76D of each of the pillar portions 76 and forms an annular shape as a whole. Thus, a step 76B (see FIG. 15) is formed by the surface 762 outside in the radial direction of the pillar portion 76, a side surface 763 in the circumferential direction of the extending front end portion 76D of the pillar portion 76, and a surface 732 outside in the radial direction of the tubular coupling portion 73D extending in the circumferential direction from the inner end portion in the radial direction of the extending front end portion 76D of the pillar portion 76.

The stator coil 74 of the second embodiment is annularly wound so as to have the shaft line 7x in the radial direction with respect to the shaft line 2x. In the embodiment, the stator coil 74 is wound around the pillar portions 76 into a quadrangular shape using the steps 76A and 76B. Specifically, the stator coil 74 is wound so as to surround an annular surface constituted of one end surface 761 in the extending direction of the pillar portion 76 (the shaft line direction of the rotation shaft 2), the other end surface 764, one side surface 763 in the circumferential direction of the pillar portion 76, and the other side surface 763. Then, the outer peripheral surface 731 of the fitting fixing portions 73A forming a stepped lower surface in the step 76A and the surface 732 outside in the radial direction of the tubular coupling portion 73D forming a stepped lower surface of the step 76B function as winding position regulating portions (winding position regulation unit) regulating the winding position inside in the radial direction with respect to the shaft line 2x of the rotation shaft 2 of the stator coil 74 wound around the pillar portion 76, whereby the stator coil 74 is stably wound around the pillar portions 76.

Figure 16A:
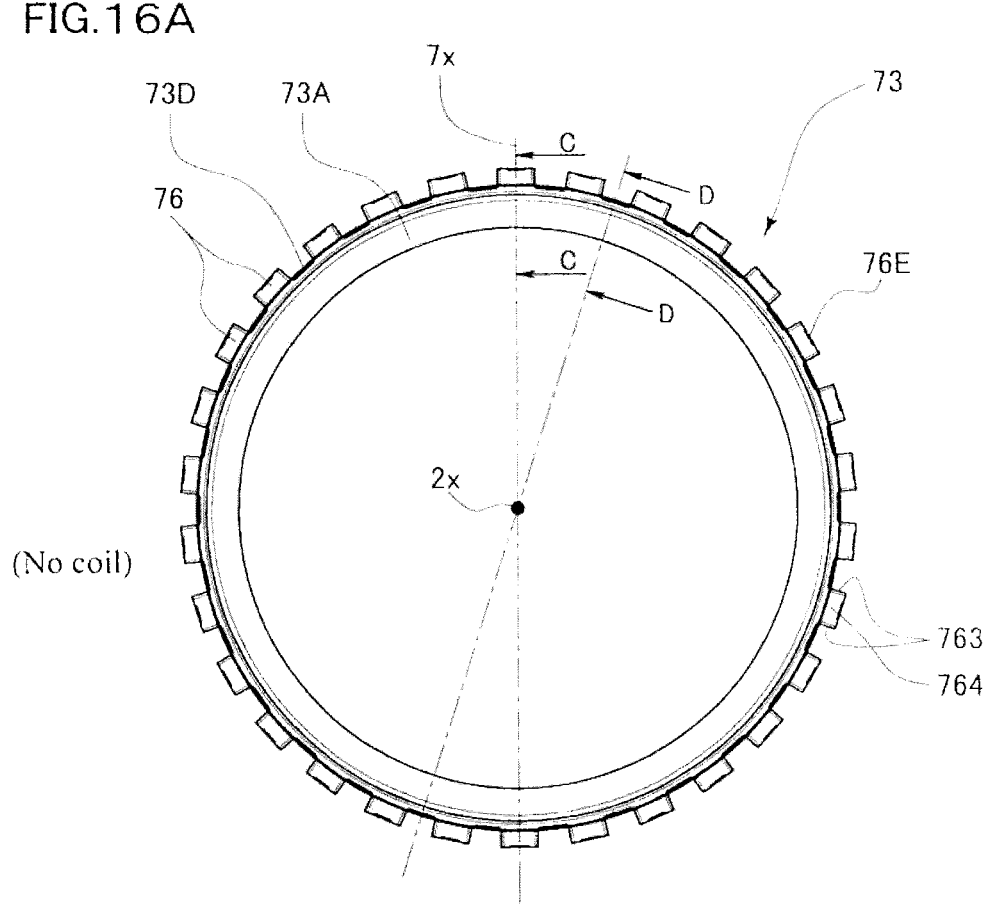
FIG. 16A is a front view of the stator of FIG. 15.
Figure 16B:
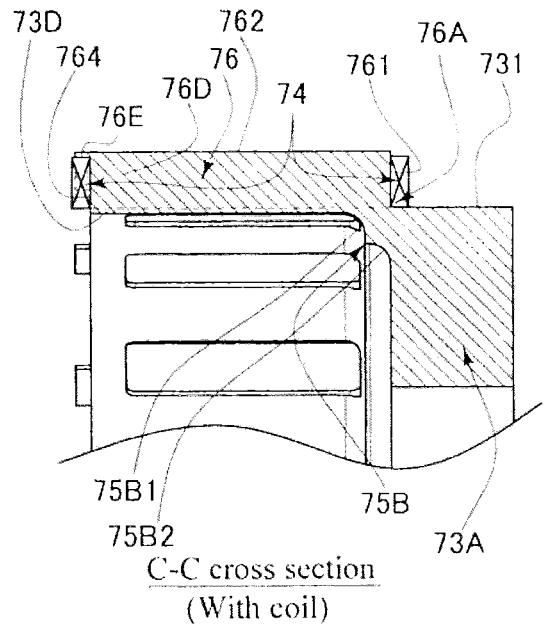
FIG. 16B is a C-C cross-sectional view of the stator of FIG. 16A.
Figure 16C:
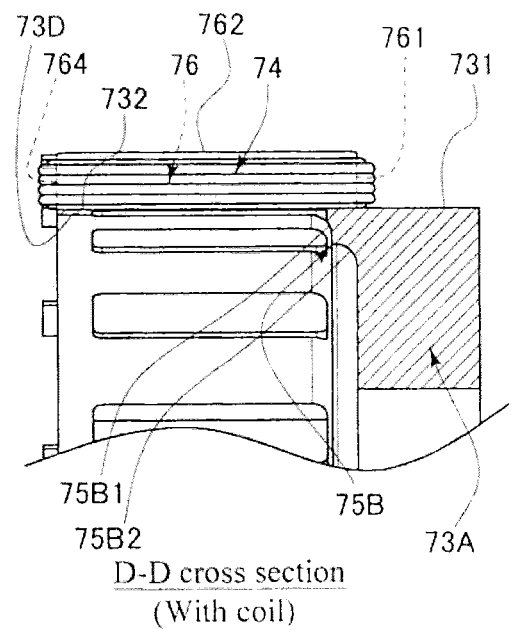
FIG. 16C is a D-D cross-sectional view of the stator of FIG. 16A.

As shown in FIG. 16B, the pillar portions 76 each have a protrusion 76E further extending from the outer end portions in the radial direction of the extending front end portion 76D in the same direction as the extending direction of the extending front end portion 76D. The protrusion 76E functions as winding position regulating portion (winding position regulation unit) regulating the winding position outside in the radial direction with respect to the shaft line 2x of the rotation shaft 2 of the stator coil 74 wound around the pillar portion 76, whereby the stator coil 74 is stably wound around the column portions 76. In the embodiment, since the position of the stator coil 74 is regulated inside and outside in the radial direction thus, it is possible to maintain the state that the stator coil 74 is stably wound around the pillar portions 76, and the winding operation by an operator is facilitated.

Figure 17:
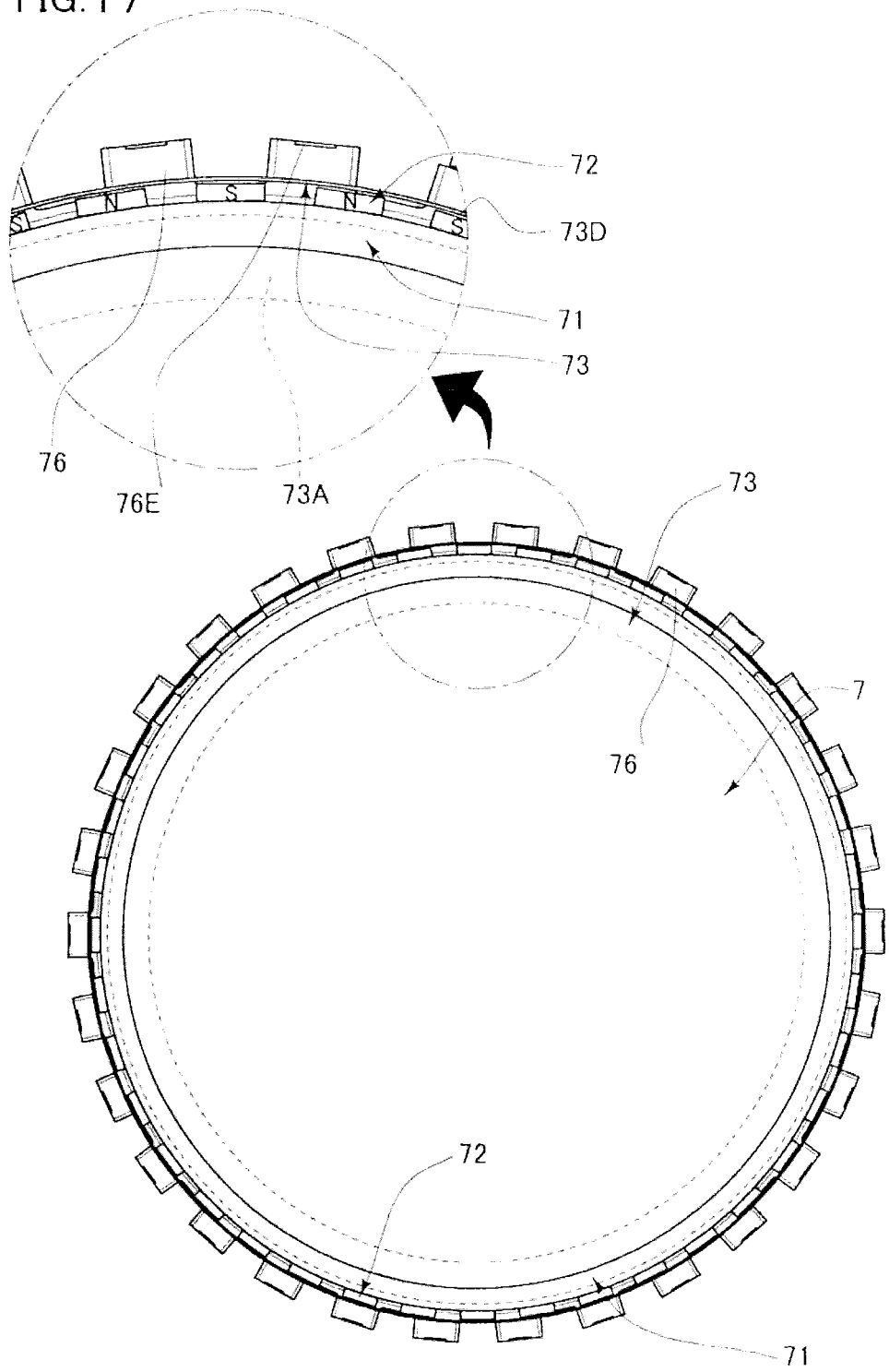
FIG. 17 is a front view and a partial enlarged view showing a positional relationship between the stator of FIG. 15 and magnetic members.

The rotor 71 in the electric motor 70 is coaxial with the rotation shaft 2 and rotates integrally with the flywheel 7. The same number of the magnetic members 72 are arranged at predetermined intervals in the circumferential direction on the facing surface with the stator coil 74 in the rotor 71 and fixed by fastening members. As shown in FIG. 17, a plurality of the stator coils 74 are arranged at predetermined intervals along the circumferential direction in an annular facing region on the stator 73 which is concentric with the magnetic member 72 of the rotating rotor 71 and faces the magnetic member 72. In the embodiment, the magnetic member 72 and the stator 74 face each other in the radial direction with respect to the shaft line 2x of the rotation shaft 2.

The rotor 71 in the electric motor 70 of the embodiment can be regarded as a front end of the flywheel 7, or a front end of the outer peripheral end portion 70D of the flywheel 7. The rotor 71 is coaxial with the flywheel 7 and rotates integrally with the flywheel 7. The front end 71 of the outer peripheral end portion 70D of the flywheel 7 has a shape that projects toward one or both the sides in the shaft line direction of the rotation shaft 2, whereby the outer peripheral surface 71S with a large area is secured, and the magnetic members 72 are arranged directly on the outer peripheral surface 71S to be fastened and fixed by fastening members. Namely, the outer peripheral surface 71S of the flywheel 7 is the arrangement surface of the magnetic members 92, 92. The magnetic member 72 and the stator coil 74 of the electric motor 70 of the embodiment are provided at different positions from the magnetic members 52 and 92 and the stator coils 54 and 94 of the first power generator 5 and the second power generator 9 and are different therefrom. Even if the flywheel 7 is being rotated by the electric motor 70, the electric power is generated by the second power generator 9.

Hereinafter, a variation of the second embodiment will be described.

Figure 28:
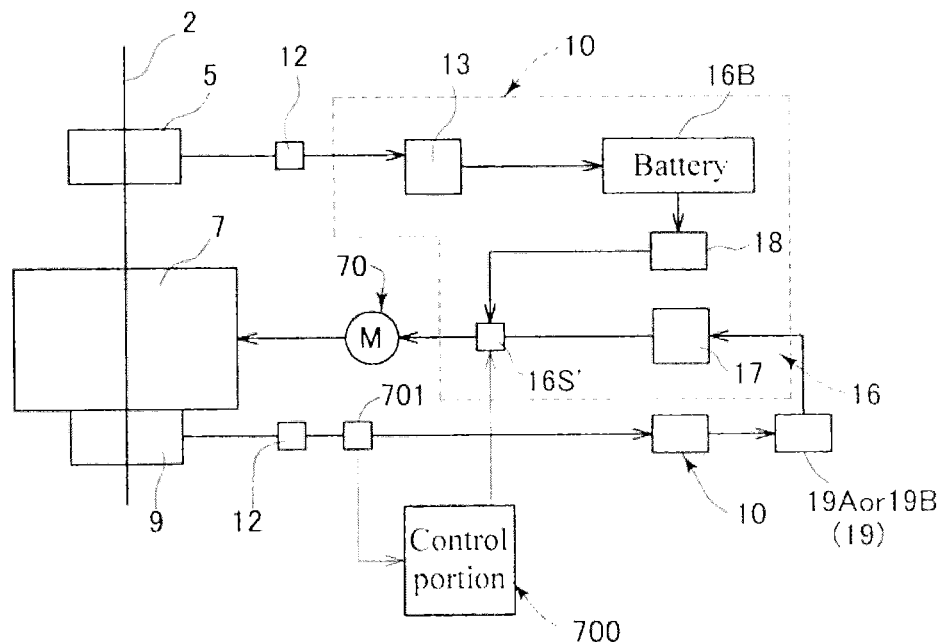
FIG. 28 is a seventh variation of the block diagram showing in a simplified manner an electrical configuration of the output portion and the drive electric power supply portion in the wind power generator of the second embodiment.
Figure 29:
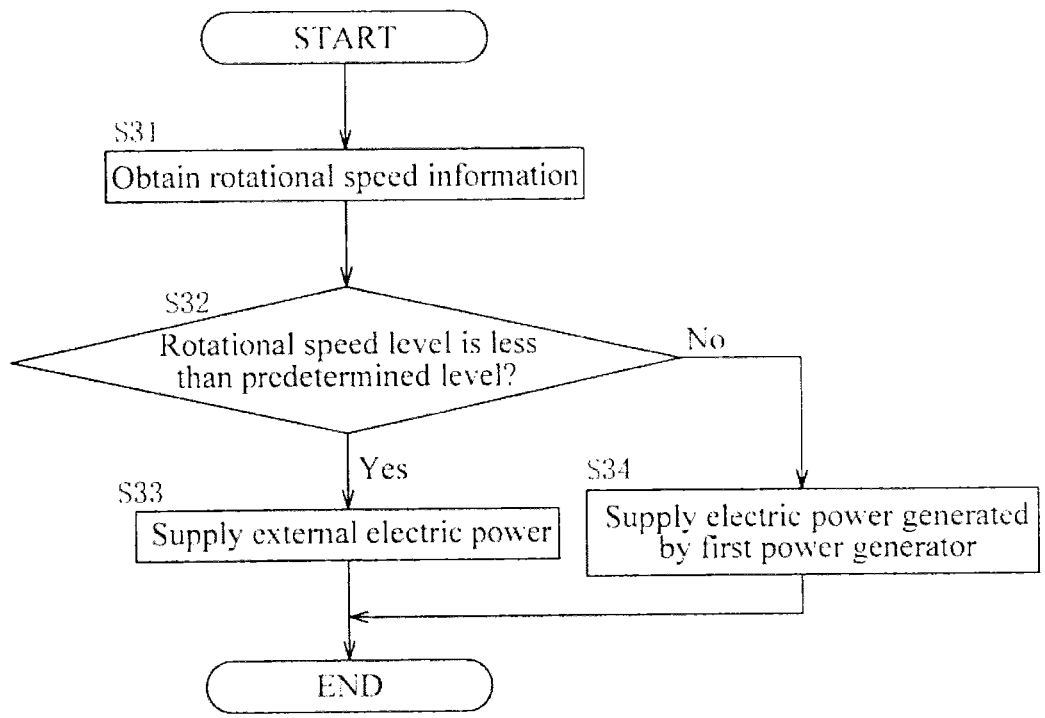
FIG. 29 is a second example of a flowchart showing a flow of the drive electric power supply control to the electric motor.

In the above embodiment, as shown in FIGS. 12A and 12B, although the drive electric power supply portion 16 supplies as the drive electric power for the electric motor 70 the electric power, supplied from a power supply (19A or 19B) of the external device 19, to the electric motor 70, the following constitution may be adopted. Namely, the constitution shown in FIG. 28 is provided, and when the rotational speed level of the flywheel detected by the rotational speed level detecting portion (rotational speed level detection unit) 701 is less than a previously determined threshold rotational speed level, the control portion (drive electric power control unit) 700 makes the drive electric power supply unit supply the electric power, as the drive electric power for the electric drive unit, from the power supply (19A or 19B) of the external device 19. When the rotational speed level of the flywheel is not less than the threshold rotational speed level, the electric power generated by the first power generator (power generation unit) 5 may be supplied, as the drive electric power for the electric drive unit, to the drive electric power supply unit. Specifically, as shown in FIG. 29, the control portion 700 first obtains a value, reflecting the rotational speed level of the flywheel 7, from the rotational speed level detecting portion (rotational speed level detection unit) 701 (S31). When the rotational speed level shown by the obtained value is less than the threshold rotational speed level stored in a storage portion such as ROM (S32: Yes), an electric power supply source switching portion (changeover switch) 16S' of the drive electric power supply portion 16 is switched to an external supply side, and the electric power is supplied as the drive electric power for the electric motor 70 from the power supply (19A or 19B) of the external device 19 (S33). On the other hand, when the rotational speed level shown by the obtained value is not less than the threshold rotational speed level (S32: No), the electric power supply source switching portion (changeover switch) 16S' of the drive electric power supply portion 16 is switched to the first power generator 5 side, and the electric power generated by the power generator 5 is supplied as the drive electric power for the electric motor 70 (S34). Consequently, when the rotational speed of the flywheel is low, the electric power is stably supplied from the external device 19 (19A or 19B), and the rotational speed can be returned immediately. When the flywheel 7 rotates at a certain degree of speed, even if the flywheel 7 receives a very small amount of supply of the electric power generated by the first power generator 5, the rotational speed can be increased. The case where the rotational speed level shown by the obtained value is less than the threshold rotational speed level can include the case where the rotation of the flywheel 7 is stopped or the case where the flywheel 7 rotates at extremely low speed.

Figure 19A:
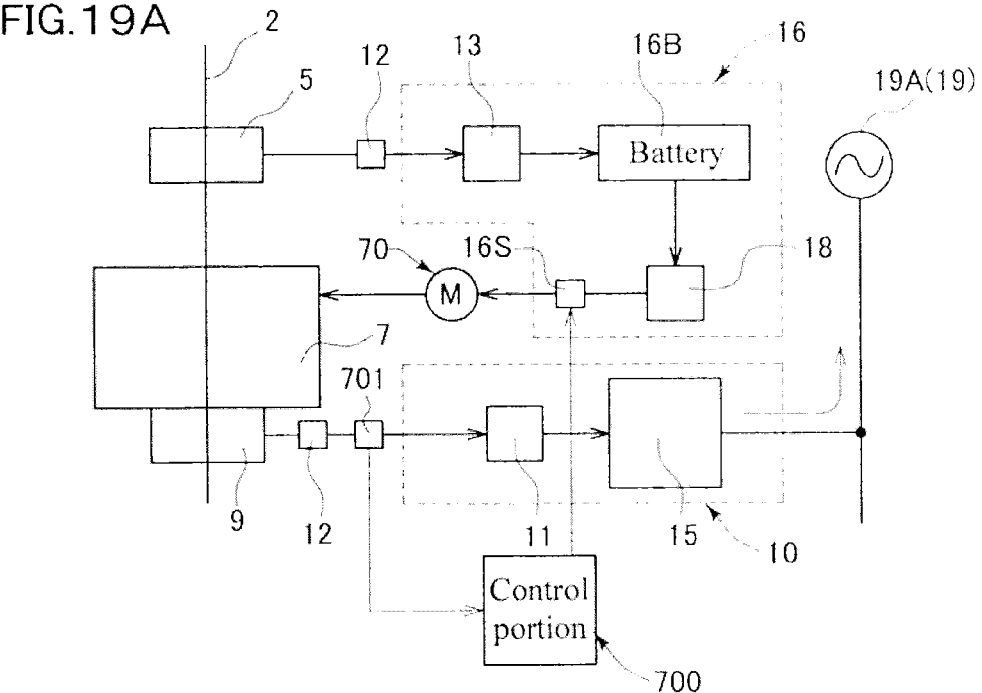
FIG. 19A is a first variation of a block diagram showing in a simplified manner an electrical configuration of the output portion and the drive electric power supply portion in the wind power generator of the second embodiment.
Figure 19B:
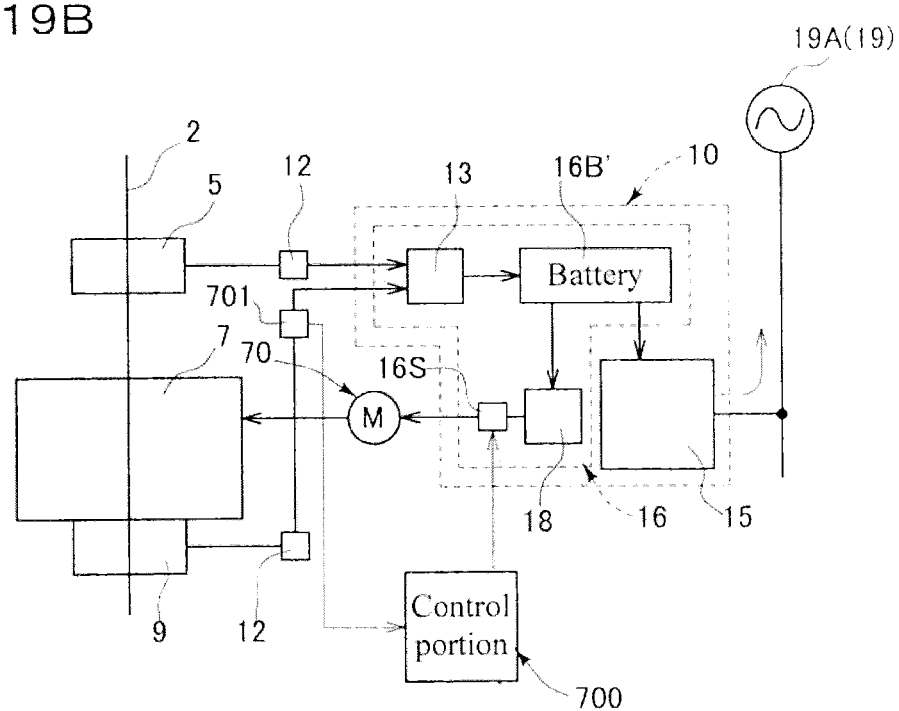
FIG. 19B is a second variation of a block diagram showing in a simplified manner an electrical configuration of the output portion and the drive electric power supply portion in the wind power generator of the second embodiment.

In the above embodiment, as shown in FIGS. 12A and 12B, the drive electric power supply portion 16 supplies the drive electric power for the electric motor 70 based on the electric power, supplied from the external power supply system 19A, to the electric motor 70. However, as shown in FIGS. 19A and 19B, the drive electric power for the electric motor 70 based on the electric power stored in the storage unit 16B such as a battery may be supplied to the electric motor 70. The drive electric power supply portions 16 of FIGS. 19A and 19B are each constituted to convert the electric power stored in the battery 16B as the storage unit into the drive electric power for the electric motor 70 to supply the drive electric power to the electric motor 70.

In the case of FIG. 19A, all the electric power generated by the first power generator 5 is stored in the battery 16B as the storage unit, and only the electric power generated by the second power generator 9 is input to the output portion 10 to be supplied externally. Specifically, the drive electric power supply portion 16 of FIG. 19A includes the battery (storage unit) 16B storing the electric power generated by the first power generator 5 and inputs the three-phase AC power generated by the first power generator 5 to the rectifier 12 to be input to the step-up controller 13, and the DC power with a predetermined voltage is supplied to the battery (storage unit) 16B to be stored therein. Meanwhile, the drive electric power for excitation for rotating and driving the electric motor (three-phase AC motor) 70 is taken from the battery 16B through the inverter 18 to be output to the stator coil 74 of the electric motor 70. Meanwhile, in the output portion 10, the three-phase AC power generated by the second power generator 9 is input to the rectifier 12 to be input to a step-up controller 11, and, thus, to be output at a predetermined voltage. The output is further input to the power conditioner 15 and the input DC power is converted into a system power to be output externally. According to this constitution, only the electric power generated by the second power generator 9 is supplied to the external power supply system 19A.

On the other hand, in the case of FIG. 19B, the electric powers generated by the first power generator 5 and the second power generator 9 are stored in a battery 16B' as the storage unit, and, at the same time the electric power externally supplied from the output portion 10 is the electric power temporarily stored in the battery 16B'. In the drive electric power supply portion 16 of FIG. 19B, the three-phase AC powers generated by the first power generator 5 and the second power generator 9 are input to the rectifier 12 to be input to the step-up controller 13, and the DC power with a predetermined voltage is supplied to the battery (storage unit) 16B' to be stored therein. Meanwhile, the drive electric power for excitation for rotating and driving the electric motor (three-phase AC motor) 70 is taken from the battery 16B' through the inverter 18 to be output to the stator coil 74 of the electric motor 70. Meanwhile, in the output portion 10, from the battery 16B' in which only the electric powers generated by the first power generator 5 and the second power generator 9 are stored, the stored electric power is input to the power conditioner 15, and the input DC power is converted into the system power to be output externally, whereby the electric powers generated by the first power generator 5 and the second power generator 9 are supplied to the external power supply system 19A.

When the drive electric power for the electric motor 70 is output based on the electric power stored in first storage unit, and, in addition, any one of the electric powers generated by the first power generator 5 and the second power generator 9 is stored in second storage unit, the first storage unit and the second storage unit may be provided as the common storage unit 16B and 16B' as shown in FIGS. 19A and 19B or may be provided as different storage unit. However, in the storage unit 16B storing only the electric power generated by the first power generator 5 and the storage unit 16B' storing the electric powers generated by the first power generator 5 and the second power generator 9, the storage unit 16B' has a larger storage capacity than the storage unit 16B. The external storage unit 19B (see FIG. 12B) has a larger storage capacity than the storage unit 16B storing only the electric power generated by the first power generator 5. It is preferable that the storage unit 16B and 16B' are electrically connected to the power generators 5 and 9 and the electric motor 70 without rotating and sliding, and it is preferable that the wiring distance is short; therefore, the storage unit 16B and 16B' are provided in the nacelle 21. Particularly, the lower-capacity storage unit 16B is suitable to be mounted as an auxiliary battery in the nacelle 21 from a size standpoint.

Figure 20:
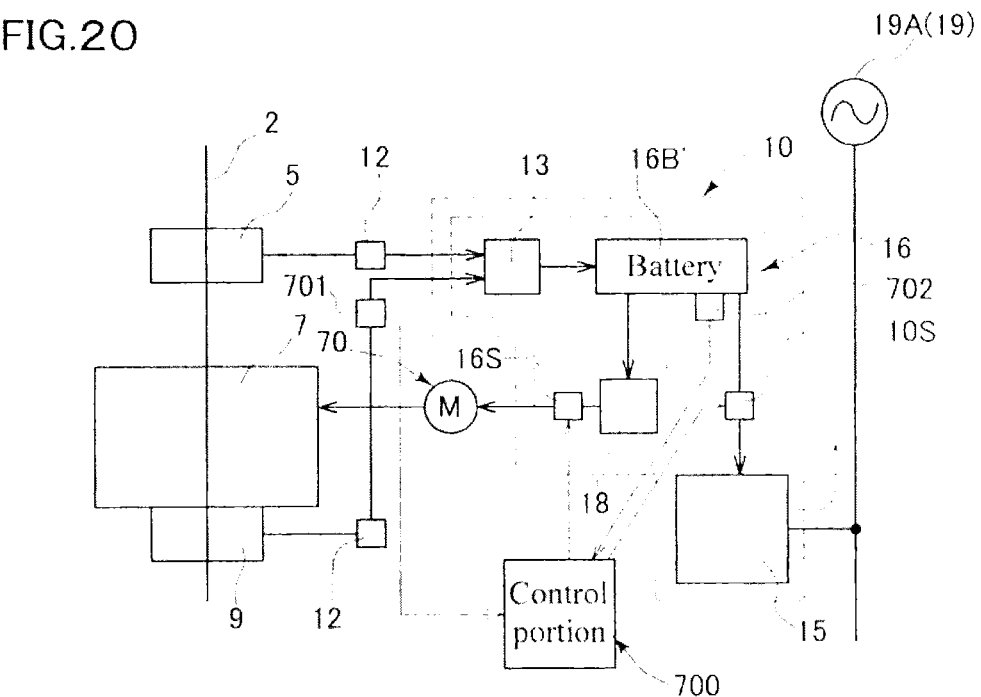
FIG. 20 is a third variation of a block diagram showing in a simplified manner an electrical configuration of the output portion and the drive electric power supply portion in the wind power generator of the second embodiment.
Figure 21:
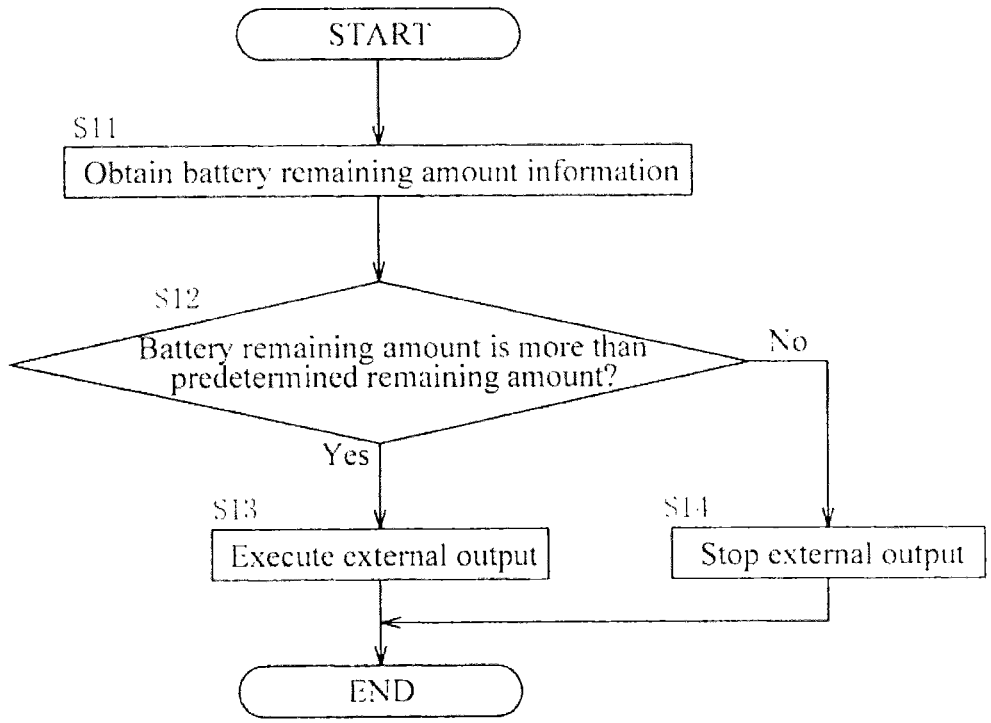
FIG. 21 is a flowchart showing a flow of an electric power supply control to an external device.

As shown in FIGS. 19A and 19B, when the electric power externally supplied from the output portion 10 is the electric power temporarily stored in the batteries 16B and 16B' as the storage unit, a remaining amount detecting portion (remaining amount detection unit) 702 and a control portion (output power control unit) 700 may be provided as shown in FIG. 20, for example. The remaining amount detecting portion 702 detects the remaining amount in the batteries 16B and 16B' as the storage unit. When the detected remaining amount is more than a previously determined first threshold remaining amount, the control portion 700 performs supply switch control for the output portion 10 when the electric power stored in the batteries 16B and 16B' is supplied externally. Specifically, the control portion 700 is connected to the remaining amount detecting portion 702, and the CPU executes the external electric power supply control as shown in FIG. 21. In FIG. 21, first, the control portion 700 obtains remaining amount information of the battery 16B' from the remaining amount detecting portion 702 (S11). Since a first threshold remaining amount level (for example, a full charge level) is stored in a storage portion such as ROM, when the battery remaining amount shown by the obtained remaining amount information is more than the first threshold remaining amount level (S12: Yes), an external output switching portion (changeover switch) 10S is switched to the supply side (output side) to perform the external electric power supply (S13). On the other hand, when the battery remaining amount is not more than the first threshold remaining amount level (S12: No), the external output switching portion (changeover switch) 10S is switched to a cutting-off side to cut off/stop the external electric power supply (S14).

Figure 22:
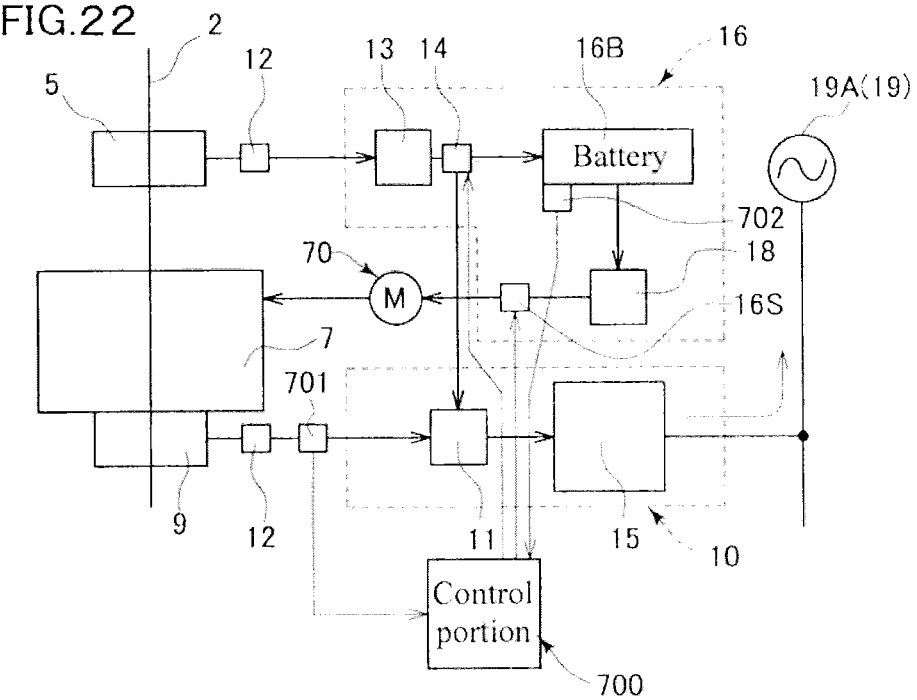
FIG. 22 is a fourth variation of a block diagram showing in a simplified manner an electrical configuration of the output portion and the drive electric power supply portion in the wind power generator of the second embodiment.
Figure 23:
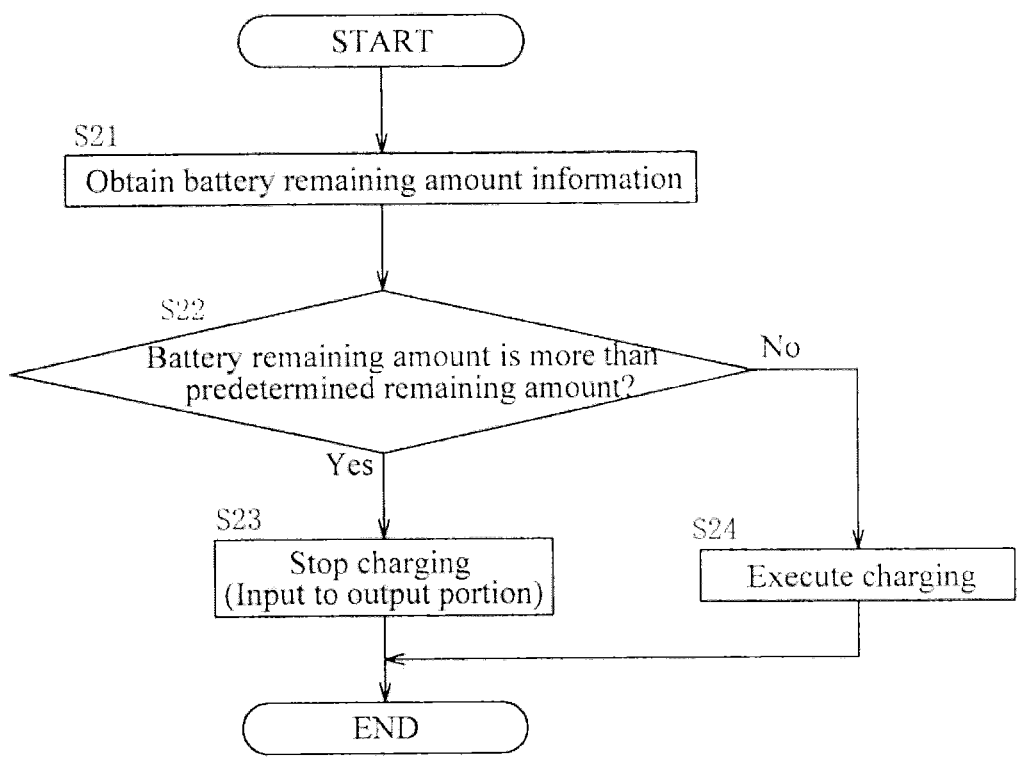
FIG. 23 is a flowchart showing a flow of an electric power input control to storage unit.

As shown in FIGS. 19A, 19B, and 20, when the drive electric power for the electric motor 70 is the electric power temporarily stored in the batteries 16B and 16B' as the storage unit, the remaining amount detecting portion (remaining amount detection unit) 702 and the control portion (stored electric power control unit) 700 may be provided as shown in FIG. 22, for example. The remaining amount detecting portion 702 detects the remaining amount in the batteries 16B and 16B' as the storage unit. The control portion 700 executes input switching control of the electric power input to the batteries 16B and 16B' as the storage unit to be stored therein according to whether or not the detected remaining amount is more than a previously determined second threshold remaining amount. Specifically, the control portion 700 is connected to the remaining amount detecting portion 702, and the CPU executes the electric power input control to the batteries 16B and 16B' as the storage unit as shown in FIG. 23. In FIG. 23, first, the control portion 700 obtains the remaining amount information of the battery 16B from the remaining amount detecting portion 702 (S21). Since a second threshold remaining amount level (for example, a full charge level) is stored in a storage portion such as ROM, when the battery remaining amount shown by the obtained remaining amount information is not more than the second threshold remaining amount level (S22: No), an input switching portion (changeover switch) 14 to the battery 16B as the storage unit is switched to a battery supply side (battery input side) to input the generated electric power to the battery 16B, and, thus, to store the electric power in the battery 16B (S24). On the other hand, when the battery remaining amount shown by the obtained remaining amount information is more than the second threshold remaining amount level (S22: Yes), the input switching portion (changeover switch) 14 to the battery 16B is switched to a cutting-off side (battery input inhibition side) to cut off/stop the input of the generated electric power to the battery 16B (S23). Alternatively, in the case of FIG. 22, when the battery remaining amount shown by the obtained remaining amount information is more than the second threshold remaining amount level (S22: Yes), the input switching portion (changeover switch) 14 to the battery 16B is switched to an external output side (the output portion 10 side), and the electric power generated by the first power generator 5 and the electric power generated by the second power generator 9 may be output together from the output portion 10 to an external device (for example, the external system power 19A) (S23). In the case of FIG. 22, when the input switching portion (changeover switch) 14 is switched to the external output side (the output portion 10 side), the electric power stepped up in the step-up controller 13 to be input to the battery 16B is input to the step-up controller 11 of the output portion 10 to be input to the power conditioner 15, and, thus, to be output externally.

When the drive electric power for the electric motor 70 is output based on the electric power stored in the first storage unit, and any one of the electric powers generated by the first power generator 5 and the second power generator 9 is stored in the second storage unit, the first storage unit and the second storage unit may be provided as the common storage unit 16B, 16B', and 19B as shown in FIGS. 19A, 19B, and 12B or may be provided as different storage unit. Especially when one of the storage unit is the lower-capacity auxiliary storage unit 16B, the storage unit 16B may be provided separately from the relatively high capacity storage unit 16B' and 19B. Especially, it is preferable that the storage unit 16B is provided separately from the external storage unit 19B.

Hereinafter, a variation of the third embodiment will be described.

Figure 13:
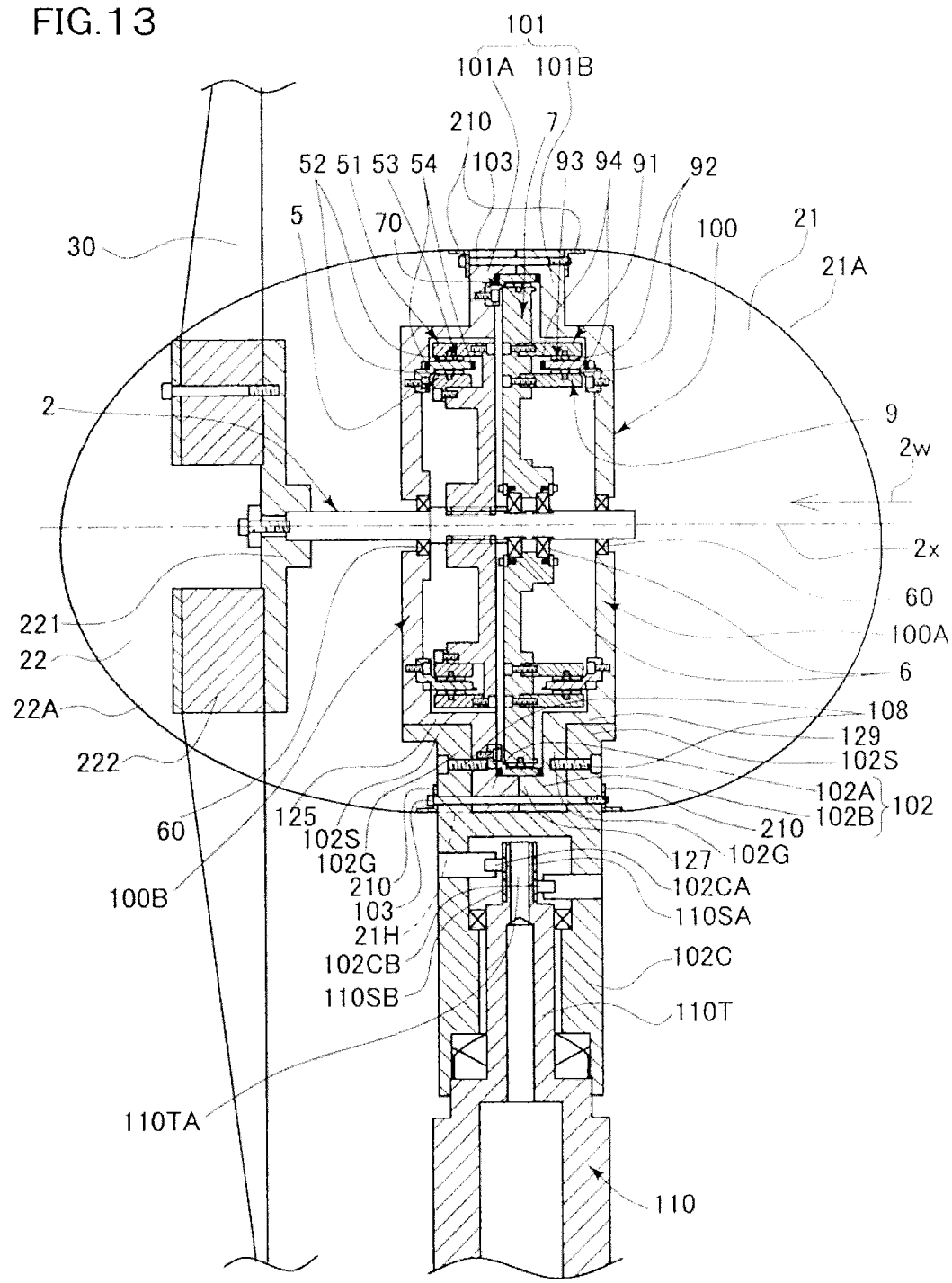
FIG. 13 is an enlarged cross-sectional view of a nacelle portion in the wind power generator of the second and third embodiments.
Figure 26:
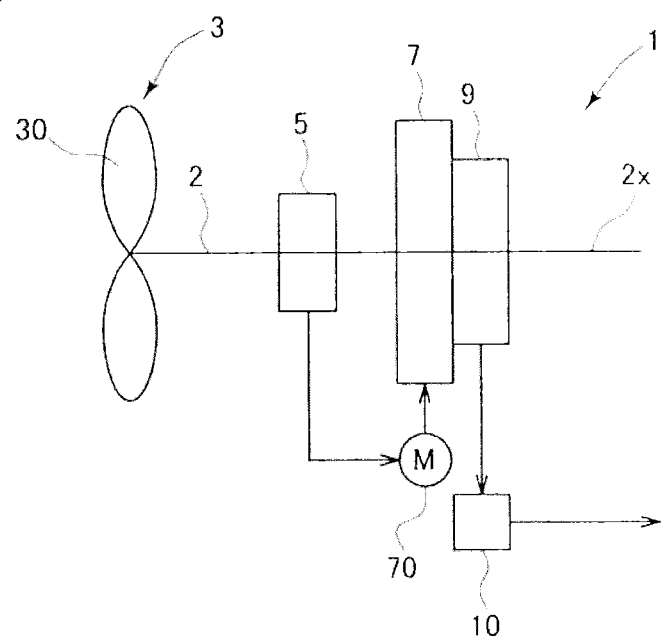
FIG. 26 is a block diagram showing in a simplified manner an electric configuration of the wind power generator of the third embodiment in the invention.

Although the wind power generator of the third embodiment has a constitution similar to that in FIGS. 1 and 4, the constitution of the block diagram is different from that of the first embodiment and the second embodiment and shown in FIG. 26. Further, the constitutions of the output portion 10 and the drive electric power supply portion 16 are different from those of the first embodiment and the second embodiment and shown in FIGS. 27A and 27B. With regard to the constitution in the power generation case 100, as in the second embodiment, the electric motor 70 is provided as shown in FIGS. 13 and 14. The constitution and arrangement of the stators 53 and 93, the stator coils 54 and 94, and the magnetic members 52 and 54 in the power generators 5 and 9 are similar to those of the second embodiment.

The wind power generator 1 of the third embodiment is constituted to comprise the windmill 3 in the first and second embodiments, the first power generator (power generation unit) 5, the flywheel 7, and the second power generator (power generation unit) 9 and, as shown in FIG. 26, further comprise an electric motor (motor: electric drive unit) 70 and a drive electric power supply portion (drive electric power supply unit) 16. The electric motor 70 rotates and drives the flywheel 7 in the constant rotational direction using the electric power, generated by the first power generator 5, as a drive source. The drive electric power supply portion 16 supplies, as the drive electric power for the electric motor 70, all the electric power generated by the first power generator 5.

Figure 27A:
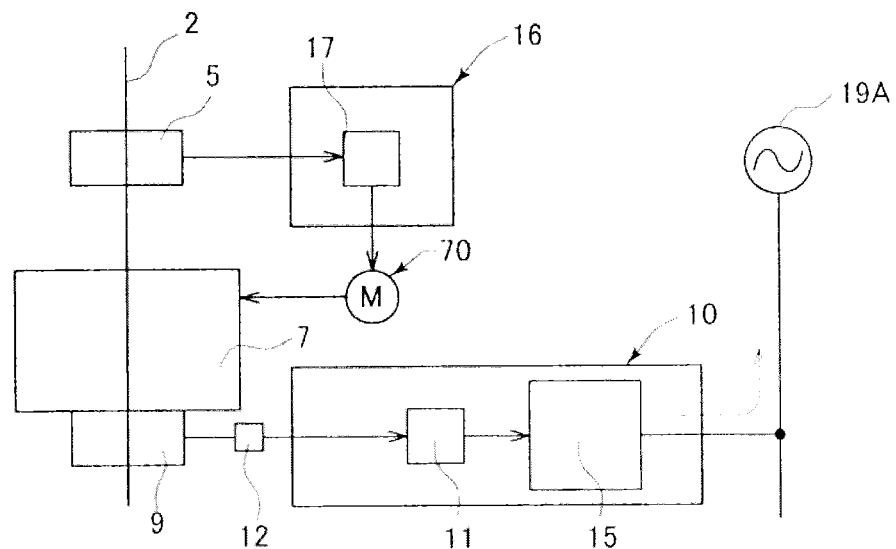
FIG. 27A is a first example of a block diagram showing in a simplified manner an electrical configuration of the output portion and the drive electric power supply portion of the wind power generator of the third embodiment.
Figure 27B:
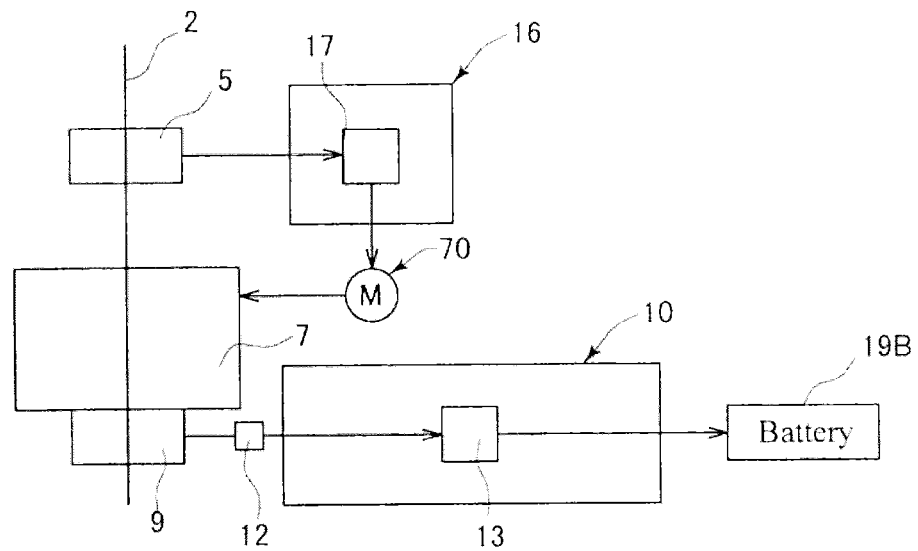
FIG. 27B is a second example of a block diagram showing in a simplified manner an electrical configuration of the output portion and the drive electric power supply portion of the wind power generator of the third embodiment.

As shown in FIGS. 27A and 27B, the drive electric power supply portion 16 inputs the three-phase AC power, generated by the first power generator 5, to a three-phase inverter 17 to be converted into the electric power for excitation (drive electric power) for the electric motor (three-phase AC motor) 70, and, thus, to be output to the stator coil 74 of the electric motor 70. In the third embodiment, the electric power generated by the first power generator 5 is not stored, but the electric power generated by the first power generator 5 is supplied as it is as the drive electric power for rotating and driving the flywheel 7.

The wind power generator 1 of the third embodiment is constituted to further comprise the output portion (output unit) 10 which receives only input of the electric power generated by the second power generator 9 and outputs the electric power to the external device 19.

In the output portion 10, as shown in FIG. 27A, for example, the three-phase AC power generated by the second power generator 9 is input to a rectifier 12 to be input to a step-up controller 11, and, thus, to be output at a predetermined voltage. The output is further input to a power conditioner 15, and the input DC power is converted into a system power to be output. According to this constitution, only the electric power generated by the second power generator 9 can be supplied to an external power supply system 19A, and the electric power, for example, may be sold. Alternatively, the power conditioner 15 converts the electric power into AC power that can be used at home, and the AC power may be output. Further, in the output portion 10, as shown in FIG. 27B, the electric power generated by the second power generator 9 is input to the rectifier 12 to be input to a step-up controller 13, and the DC power with a predetermined voltage may be supplied to a battery (storage unit) 19B to be stored therein. Further, the electric power stored in the battery (storage unit) 19B may be supplied to an external power supply system 19A through the power conditioner 15.

Other variations that can be applied to the above embodiments will be described below.

Figure 33:
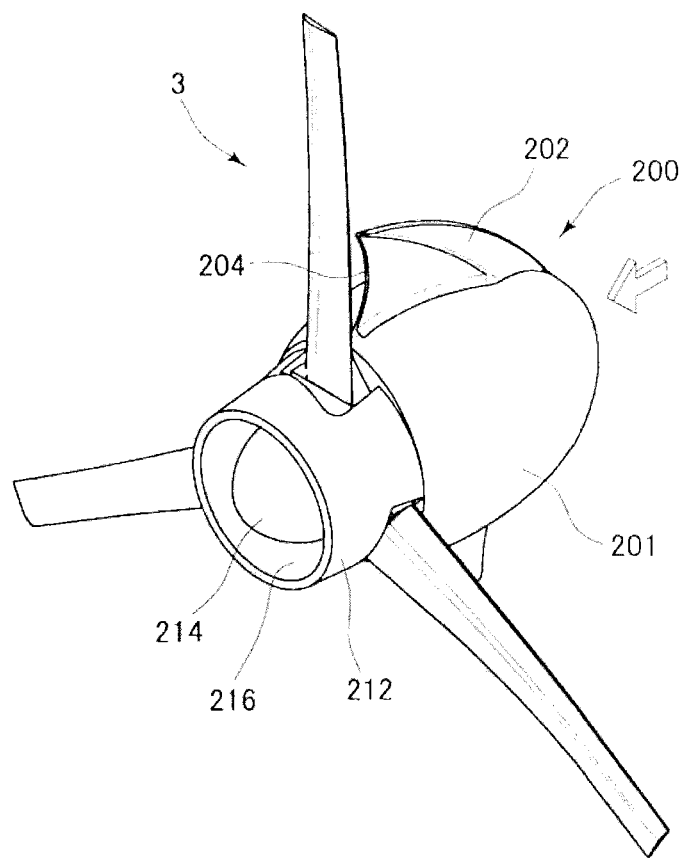
FIG. 33 is a rearward oblique perspective view of FIG. 30.
Figure 34:
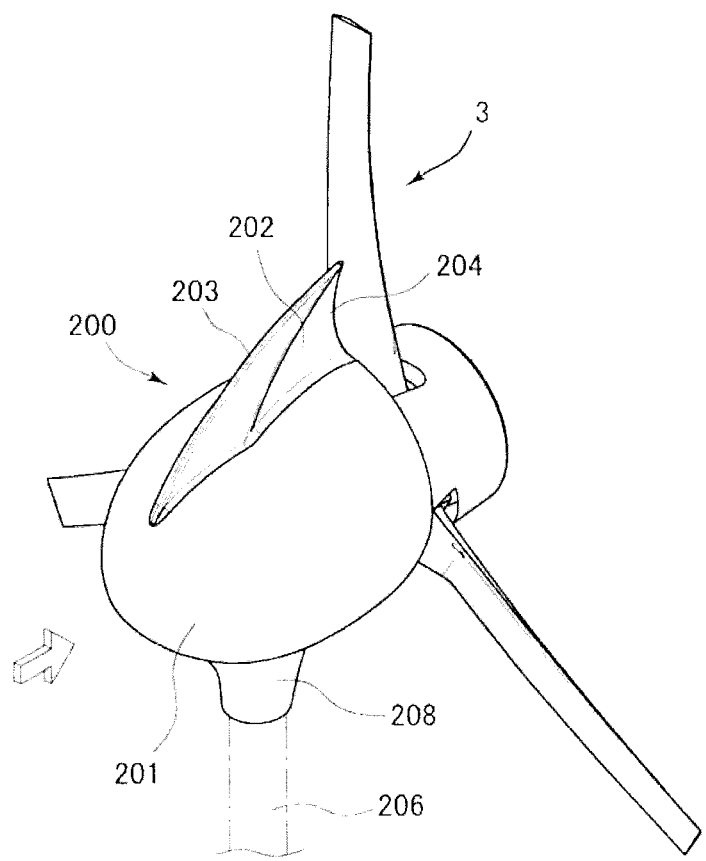
FIG. 34 is a forward oblique perspective view of FIG. 30.
Figure 36:
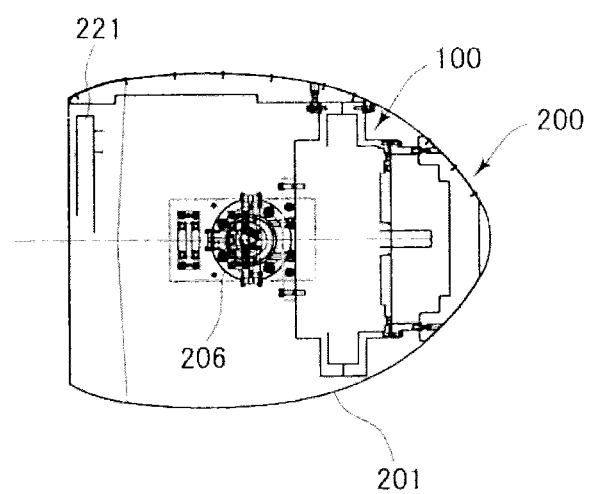
FIG. 36 is a bottom perspective view of a wind guide case portion of FIG. 35.

As shown in FIGS. 30 to 34, a wind guide case (nacelle) 200 serving as a power generation portion case (housing) is provided on the windward side of the windmill 3 (blade 30). The wind guide case 200 stores therein a power generation portion, and a wind direction fin (wind direction plate portion) 202 can be integrally formed outside the wind guide case 200 (case body 201). In this example, a tubular wind tunnel portion (duct) 31 shown in FIGS. 33 and 36 is not provided outside the windmill 3, and the windmill 3 receives the wind barely (in a state of being exposed). In the case body 201 of the wind guide case 200, the cross section perpendicular to the shaft direction of the windmill 3 has a smooth outer peripheral surface having a vertically long elliptical shape or a circular shape. The end portion on the windward side of the case body 201 becomes thinner smoothly as it approaches the front end. The front end of the case body 201 has a circular-arc longitudinal cross section having a small curvature.

Figure 31:
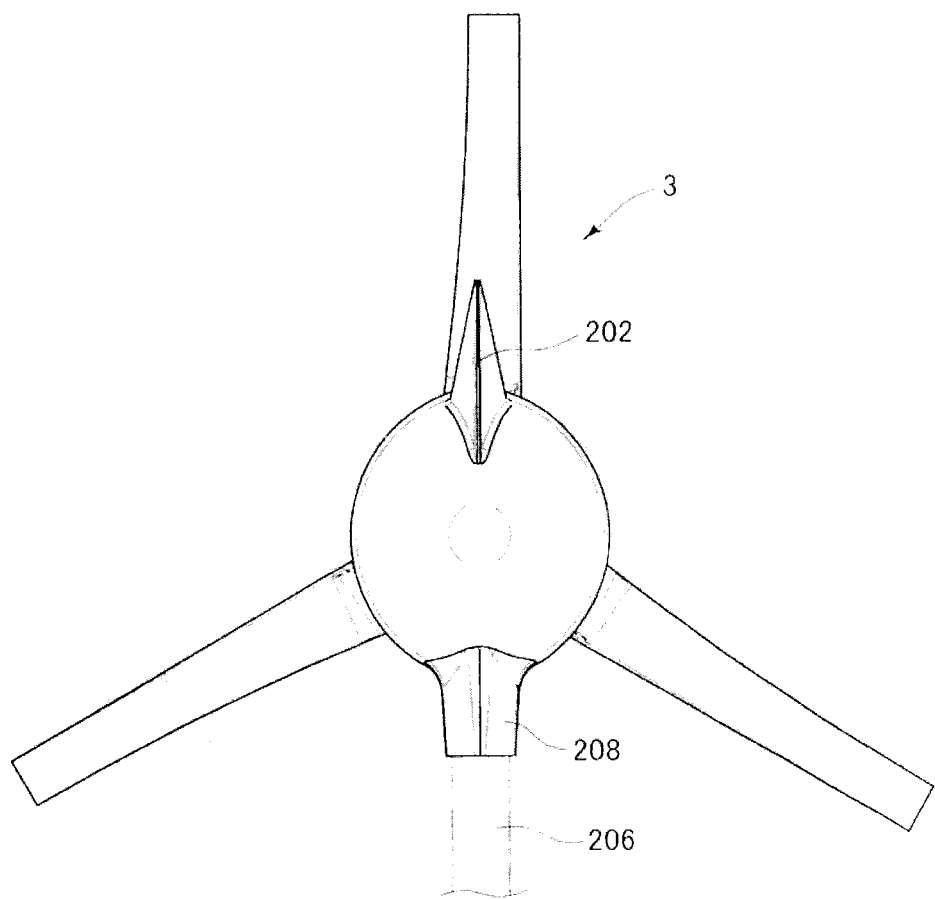
FIG. 31 is a front view of FIG. 30.
Figure 32:
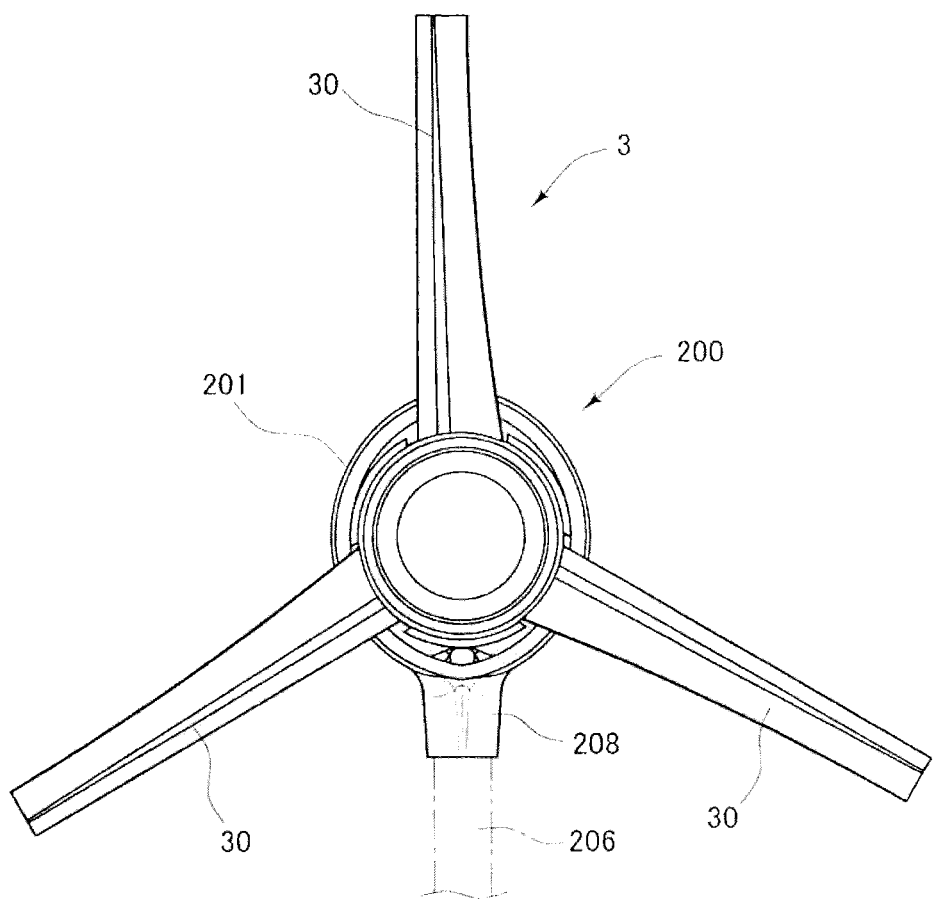
FIG. 32 is a rear view of FIG. 30.

The wind direction fin 202 is provided on the outer peripheral surface of the case body 201 in a direction along the shaft direction of the windmill 3 so as to protrude outward (for example, upward) from the outer peripheral surface of the case body 201 (the wind guide case 200). The wind direction fin 202 has the orthogonal positional relationship with the rotational surface of the windmill 3. The wind direction fin 202 comprises an oblique side 203 whose length is equal to or slightly smaller than the length in the shaft direction of the case body 201 and height gradually increases in a circular arc manner (or linearly) from the vicinity of the front end on the windward side of the case body 202. The wind direction fin 202 further comprises a rear end portion 204 which has the largest height near the end portion on the leeward side of the case body 201 and descends to dig in (be bored) in a circular arc manner (in a curved manner) from the top to the windward side (the wind direction fin 202 may comprise a rear end portion expanding in a circular arc manner on the leeward side or a rear end portion drooping linearly), and the lower end continues on the upper surface of the case body 201. The oblique side 203 of the wind direction fin 202 is formed into a sharp-pointed knife edge shape. The wind direction fin 202 has a curved surface that becomes sharp-pointed from the intermediate portion toward the rear end portion 204 as it approaches the rear end. The intermediate portion in the wind direction of the wind direction fin 202 has the largest thickness, and the wind direction fin 202 has a sharp-pointed triangular shape as shown in FIG. 31 as viewed from the windward side.

Figure 30:
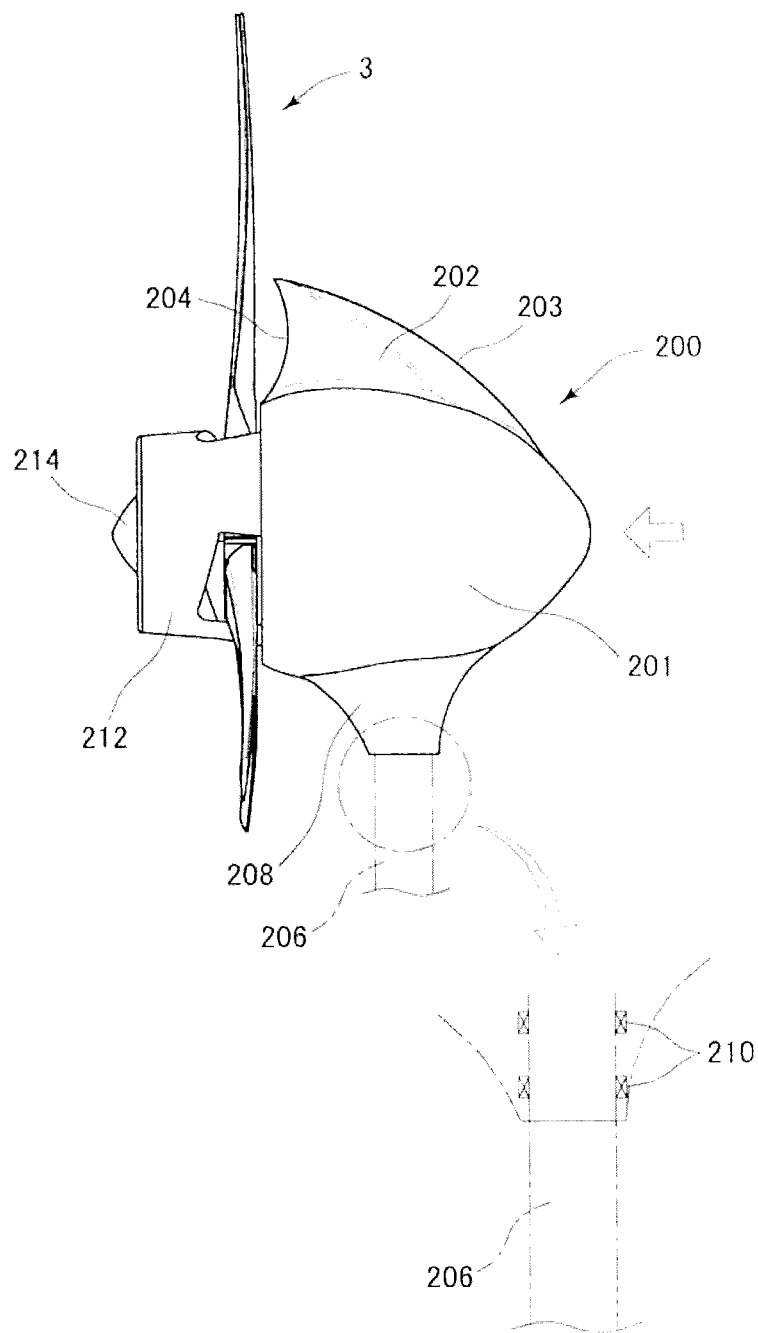
FIG. 30 is a side view of another embodiment of the invention.

A column connecting portion 208 is provided on the opposite side (lower side) of the wind direction fin 202 so that the shaft line of the case body 201 lies between those. The column connecting portion 208 connects the case body 201 with a column (pole) 206 maintaining the windmill 3 at a predetermined height, and the column 206 is connected to the column connecting portion 208. The column connecting portion 208 protrudes downward from the lower surface of the case body 201, and the end becomes thinner smoothly. The lower end portion of the column connecting portion 208 is formed into a cylindrical shape, and the upper end portion of the circular cross section of the column 206 is fitted in the cylindrical portion. As shown in FIG. 30, the wind guide case 200 and the windmill 3 are rotatably supported around a shaft line (vertical shaft) of the column 206 through a bearing 210. Consequently, the windmill 3 and the wind guide case 200 are kept in a free state so that the wind direction fin 202 of the wind guide case 200 follows the wind direction; in other words, the rotating surface of the windmill 3 always faces the wind direction.

Figure 35:
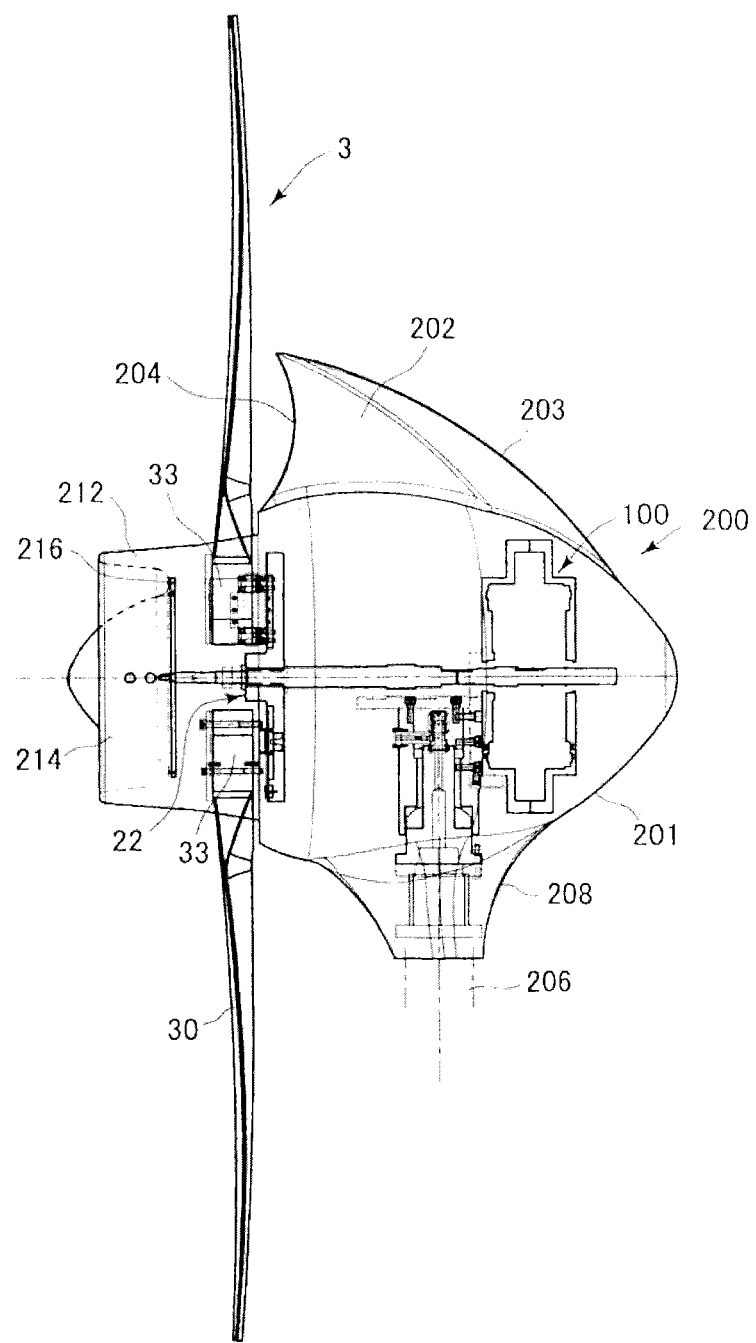
FIG. 35 is a side cross-sectional view (side perspective view) of FIG. 30.

FIG. 35 is aside cross-sectional view (perspective view) of a portion including the windmill 3 and the wind guide case 200. The wind guide case 200 includes the rotation shaft 2 of the windmill 3 arranged to be concentric with the center line of the wind guide case 200. The power generation case body 100 shown in FIGS. 5, 6, 13, and 14 is concentrically assembled with the rotation shaft 2.

As shown in FIGS. 30, 33, and 35, the central portion of the windmill 3 (the base end portion of the blade 30) is occupied by the tubular portion 212 having a circular cross section, and the tubular portion 212 includes a cone-shaped central portion 214 conically projecting from the central portion of the tubular portion 212 to the opposite side of the wind guide case 200 (the leeward side). An annular recess 216 with cone whose width becomes smaller as it approaches toward the bottom portion is formed between the cone-shaped central portion 214 and the tubular portion 212 (a substantially cylindrical portion whose diameter is reduced in a slight tapered manner on the leeward side). The hub 22 and the blade fixing portion 33 are arranged in the tubular portion 212 and the annular recess 216. If the wind direction is significantly changed and the wind blows from the backward of the wind guide case 200, the annular recess 216 with cone receives the wind from behind to generate a rotation moment. Consequently, the wind guide case 200 and the windmill 3 in the free state change their postures (directions) by approximately 180 degrees, for example, and the postures can be changed so that the front end of the wind guide case 200 faces to the windward side (faces the wind).

EXPLANATION OF INDICIA

1 Wind power generator
2 Rotation shaft
2x Rotation shaft line
2w Wind receiving direction
3 Windmill
5 First power generator (power generation unit)
6 One-way clutch
7 Flywheel
9 Second power generator (power generation unit)
30 Blade
31 Tubular wind tunnel portion (duct)
21 Nacelle
22 Hub
100 Power generation case body
110 Column (tower)
51, 91 Rotor (generator rotor)
51A First rotor
51B Second rotor
52, 92 Magnetic member
53, 93 Stator (generator stator)
54, 94 Stator coil
70 Electric motor (electric drive unit)
16 Drive electric power supply portion (drive electric power supply mean)

What is claimed is:

1. A wind power generator comprising:
a windmill which receives wind power to be rotated in a constant rotational direction around a predetermined rotation shaft line;
first power generation unit that has a rotor, which is arranged so as to be coaxial with a rotation shaft of the windmill and rotate integrally with the rotation shaft, and generates first electric power by the rotation of the rotor with the rotation of the rotation shaft;
a flywheel which is coaxial with the rotation shaft and arranged through a one-way clutch so that when the rotation shaft increases its speed in the constant rotational direction, the flywheel is in an integrally rotating state with the rotation shaft and rotates with increased speed, and when the rotation shaft reduces its speed in the constant rotational direction, the flywheel is separated from the rotation shaft to rotate inertially;
second power generation unit that has a rotor, which is arranged so as to be coaxial with the flywheel and rotate integrally with the flywheel, generates second electric power by the rotation of the rotor with the rotation of the flywheel, and is different from the first power generation unit;
electric drive unit that rotates and drives the flywheel in the constant rotational direction;
drive electric power supply unit that supplies drive electric power to the electric drive unit;
rotational speed level detection unit that detects a rotational speed level of the flywheel;
drive electric power control unit that when the detected rotational speed level is less than a previously determined threshold rotational speed level, makes the drive electric power supply unit supply the drive electric power to the electric drive unit; and
output unit that receives either of (a) the second electric power generated by the second power generation unit, in which the second electric power is generated by the integral rotation of the rotation shaft when the shaft increases its speed and by the integral rotation of the flywheel that is rotating at a higher speed than the rotation shaft when the rotation shaft reduces its speed, the flywheel being separated from the rotation shaft to rotate inertially, or (b) both of the first electric power generated by the first power generation unit, in which the first electric power is generated by the integral rotation of the rotation shaft, and the second electric power generated by the second power generation unit, and externally outputs the electric power inputted.

2. The wind power generator according to claim 1, wherein the drive electric power supply unit supplies the drive electric power for the electric drive unit based on the electric power supplied from an external power supply system to the electric drive unit.

3. The wind power generator according to claim 1, wherein the drive electric power supply unit supplies the drive electric power for the electric drive unit based on the electric power stored in a storage unit.

4. The wind power generator according to claim 1, wherein the output unit externally supplies input of the first electric power generated by the first power generation unit and the second electric power generated by the second power generation unit together.

5. The wind power generator according to claim 1, wherein the generated first electric power generated by the first power generation unit is stored in a storage unit, and the output unit externally supplies only the second electric power generated by the second power generation unit.

6. The wind power generator according to claim 5, further comprising:
   remaining amount detection unit that detects a remaining amount in the storage unit; and
   output electric power control unit that when the detected remaining amount is more than a previously determined threshold remaining amount, makes the output unit externally supply the electric power stored in the storage unit.

7. The wind power generator according to claim 5, further comprising:
   remaining amount detection unit that detects a remaining amount in the storage unit; and
   stored electric power control unit that when the detected remaining amount is not more than a previously determined threshold remaining amount, supplies the generated electric power to the storage unit to make the storage unit store the electric power, and when the detected remaining amount is more than the threshold remaining amount, inputs the generated electric power to the output unit to make the output unit externally output the electric power.

8. The wind power generator according to claim 1, wherein the generated first electric power generated by the first power generation unit and the generated second electric power generated by the second power generation unit are stored in a storage unit, and the electric power externally supplied from the output unit is the electric power stored in the storage unit.

9. The wind power generator according to claim 8, further comprising:
   remaining amount detection unit that detects a remaining amount in the storage unit; and
   output electric power control unit that when the detected remaining amount is more than a previously determined threshold remaining amount, makes the output unit externally supply the electric power stored in the storage unit.

10. The wind power generator according to claim 8, further comprising:
    remaining amount detection unit that detects a remaining amount in the storage unit; and
    stored electric power control unit that when the detected remaining amount is not more than a previously determined threshold remaining amount, supplies the generated electric power to the storage unit to make the storage unit store the electric power, and when the detected remaining amount is more than the threshold remaining amount, inputs the generated electric power to the output unit to make the output unit externally output the electric power.

11. The wind power generator according to claim 1, wherein the flywheel is arranged between the first power generation unit and the second power generation unit in a shaft line direction of the rotation shaft.

* * * * *